United States Patent
Kimura

(10) Patent No.: US 9,774,782 B2
(45) Date of Patent: Sep. 26, 2017

(54) IMAGE PICKUP APPARATUS AND IMAGE PICKUP METHOD

(71) Applicant: Olympus Corporation, Shibuya-ku, Tokyo (JP)

(72) Inventor: Mitsutaka Kimura, Hachioji (JP)

(73) Assignee: Olympus Corporation, Tokyo (JP)

( * ) Notice: Subject to any disclaimer, the term of this patent is extended or adjusted under 35 U.S.C. 154(b) by 68 days.

(21) Appl. No.: 14/997,497

(22) Filed: Jan. 16, 2016

(65) Prior Publication Data
US 2016/0212331 A1   Jul. 21, 2016

(30) Foreign Application Priority Data

Jan. 16, 2015 (JP) .................................. 2015-006978
Jan. 16, 2015 (JP) .................................. 2015-006979

(51) Int. Cl.
*H04N 5/228* (2006.01)
*G03B 17/00* (2006.01)
*H04N 5/232* (2006.01)
*H04N 5/262* (2006.01)

(52) U.S. Cl.
CPC ..... *H04N 5/23229* (2013.01); *H04N 5/23212* (2013.01); *H04N 5/23293* (2013.01); *H04N 5/2628* (2013.01); *H04N 5/23216* (2013.01)

(58) Field of Classification Search
CPC ......... G06T 11/60–11/80; G06T 5/006; H04N 1/00167; H04N 5/23229; H04N 5/23212; H04N 5/23293; H04N 5/23216; G02B 7/09; G02B 7/102; G02B 7/28–7/40; G03B 13/36

USPC ....... 348/208.4, 208.5, 208.7, 208.8, 208.11, 348/208.12, 208.13, 208.99, 3, 45–357; 396/50; 359/698
See application file for complete search history.

(56) References Cited

U.S. PATENT DOCUMENTS

| 2011/0187834 A1* | 8/2011 | Morifuji ................ H04N 13/02 348/47 |
| 2011/0242339 A1* | 10/2011 | Ogawa ............... H04N 5/23254 348/208.4 |
| 2014/0063569 A1* | 3/2014 | Hamada ............... G06K 9/3216 358/479 |
| 2016/0212331 A1* | 7/2016 | Kimura ................ H04N 5/2628 |

FOREIGN PATENT DOCUMENTS

JP    2007-043545    2/2007

* cited by examiner

*Primary Examiner* — Xi Wang
(74) *Attorney, Agent, or Firm* — John C. Pokotylo; Pokotylo Patent Services

(57) ABSTRACT

An image pickup apparatus includes: an image pickup device arranged such that a light receiving surface is orthogonal to an optical axis of an image pickup lens, the image pickup device acquiring primary image data; an input device that receives input of correction angles including a first angle that is an angle formed in a pitch direction relative to the light receiving surface and a second angle that is an angle formed in a yaw direction relative to the light receiving surface; an image processing unit that uses a focal length of the image pickup lens and the correction angles to generate secondary image data obtained by applying a modification process of projecting the primary image data onto a plane forming the first angle in the pitch direction relative to the light receiving surface and the second angle in the yaw direction relative to the light receiving surface.

10 Claims, 24 Drawing Sheets

IMAGE PICKUP APPARATUS AND IMAGE PICKUP METHOD

CROSS REFERENCE TO RELATED APPLICATION

This application claims the benefit of Japanese Applications No. 2015-006978 filed in Japan on Jan. 16, 2015 and No. 2015-006979 filed in Japan on Jan. 16, 2015, the entire contents of each of which are incorporated herein by their reference.

BACKGROUND OF THE INVENTION

1. Field of the Invention

The present invention relates to an image pickup apparatus and an image pickup method for applying a modification process to primary image data obtained from an image pickup device.

2. Description of the Related Art

When image pickup is performed with an image pickup apparatus, such as a digital camera, in a posture looking up at, for example, a building as an object, the building in the image is distorted into a trapezoidal shape tapered upward. For example, Japanese Patent Application Laid-Open Publication No. 2007-43545 discloses a technique, in which an acceleration sensor detects a posture of an image pickup apparatus when picking up an image of an object, and a trapezoidal correction process of automatically correcting a trapezoidal distortion of the object is executed.

A technique is known in an image pickup apparatus capable of autofocus action, in which a position of an AF area that is an area for performing autofocus is moved based on an instruction of a user.

SUMMARY OF THE INVENTION

An aspect of the present invention provides an image pickup apparatus including: an image pickup device arranged such that a light receiving surface is orthogonal to an optical axis of an image pickup lens, the image pickup device acquiring primary image data at each predetermined frame period; a focal length detection unit that acquires a focal length of the image pickup lens in synchronization with the frame period; an input device that receives input of correction angles including two values including a first angle that is an angle formed in a pitch direction relative to the light receiving surface and a second angle that is an angle formed in a yaw direction relative to the light receiving surface; an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface; an image display device that displays an image based on the secondary image data in synchronization with the frame period; and an AF control unit that performs control of changing a focus distance of the image pickup lens, wherein the input device receives input of designating a position of an AF area in the secondary image data displayed on the image display device, the image processing unit executes a conversion process of projecting the position of the AF area in the secondary image data onto a plane including the primary image data, and the AF control unit changes the focus distance of the image pickup lens to put the image pickup lens into a focused state at a position on the light receiving surface corresponding to the AF area projected onto the plane including the primary image data.

An aspect of the present invention provides an image pickup method of an image pickup apparatus, the image pickup apparatus including: an image pickup device arranged such that a light receiving surface is orthogonal to an optical axis of an image pickup lens, the image pickup device acquiring primary image data at each predetermined frame period; a focal length detection unit that acquires a focal length of the image pickup lens in synchronization with the frame period; an input device that receives input of correction angles including two values including a first angle that is an angle formed in a pitch direction relative to the light receiving surface and a second angle that is an angle formed in a yaw direction relative to the light receiving surface; an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface; an image display device that displays an image based on the secondary image data in synchronization with the frame period; and an AF control unit that performs control of changing a focus distance of the image pickup lens, the image pickup method including: a step of receiving, by the input device, input of designating a position of an AF area in the secondary image data displayed on the image display device; a step of executing, by the image processing unit, a conversion process of projecting the position of the AF area in the secondary image data onto the plane including the primary image data; and a step of changing, by the AF control unit, the focus distance of the image pickup lens to put the image pickup lens into a focused state at a position on the light receiving surface corresponding to the AF area projected onto the plane including the primary image data.

Another aspect of the present invention provides an image pickup apparatus including: an image pickup device arranged such that a light receiving surface is orthogonal to an optical axis of an image pickup lens, the image pickup device acquiring primary image data at each predetermined frame period; a focal length detection unit that acquires a focal length of the image pickup lens in synchronization with the frame period; an input device that receives input of correction angles including two values including a first angle that is an angle formed in a pitch direction relative to the light receiving surface and a second angle that is an angle formed in a yaw direction relative to the light receiving surface; an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface; an image display device that displays an image in a rectangular cut-out area in the secondary image data in synchronization with the frame period; and an AF control unit that performs control of changing a focus distance of the image pickup lens, wherein the input device receives input of designating a position of an AF area in the primary image data displayed on the image display device, and the image processing unit executes a conversion process of projecting coordinates of the AF area in the primary image data onto coordinates in the secondary image data and alters the coordinates of the AF area to coordinates in the cut-out area if the coordinates of the AF area in the secondary image data are out of the cut-out area.

Another aspect of the present invention provides an image pickup apparatus including: an image pickup device arranged such that a light receiving surface is orthogonal to an optical axis of an image pickup lens, the image pickup device acquiring primary image data at each predetermined frame period; a focal length detection unit that acquires a focal length of the image pickup lens in synchronization with the frame period; an input device that receives input of correction angles including two values including a first angle that is an angle formed in a pitch direction relative to the light receiving surface and a second angle that is an angle formed in a yaw direction relative to the light receiving surface; an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface; an image display device that displays an image in a rectangular cut-out area in the secondary image data in synchronization with the frame period; and an AF control unit that performs control of changing a focus distance of the image pickup lens, wherein the input device receives input of designating a position of an AF area in the primary image data displayed on the image display device, and the image processing unit executes a conversion process of projecting coordinates of the AF area in the primary image data onto coordinates in the secondary image data and displays, on the image display device, the entire secondary image data and an AF area icon indicating the position of the AF area in the secondary image data if the coordinates of the AF area in the secondary image data are out of the cut-out area.

An aspect of the present invention provides an image pickup method of an image pickup apparatus, the image pickup apparatus including: an image pickup device arranged such that a light receiving surface is orthogonal to an optical axis of an image pickup lens, the image pickup device acquiring primary image data at each predetermined frame period; a focal length detection unit that acquires a focal length of the image pickup lens in synchronization with the frame period; an input device that receives input of correction angles including two values including a first angle that is an angle formed in a pitch direction relative to the light receiving surface and a second angle that is an angle formed in a yaw direction relative to the light receiving surface; an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface; an image display device that displays an image in a rectangular cut-out area in the secondary image data in synchronization with the frame period; and an AF control unit that performs control of changing a focus distance of the image pickup lens, the image pickup method including: a step of receiving, by the input device, input of designating a position of an AF area in the primary image data displayed on the image display device; and a step of executing, by the image processing unit, a conversion process of projecting coordinates of the AF area in the primary image data onto coordinates in the secondary image data and altering the coordinates of the AF area to coordinates in the cut-out area if the coordinates of the AF area in the secondary image data are out of the cut-out area.

Another aspect of the present invention provides an image pickup method of an image pickup apparatus, the image pickup apparatus including: an image pickup device arranged such that a light receiving surface is orthogonal to an optical axis of an image pickup lens, the image pickup device acquiring primary image data at each predetermined frame period; a focal length detection unit that acquires a focal length of the image pickup lens in synchronization with the frame period; an input device that receives input of correction angles including two values including a first angle that is an angle formed in a pitch direction relative to the light receiving surface and a second angle that is an angle formed in a yaw direction relative to the light receiving surface; an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface; an image display device that displays an image in a rectangular cut-out area in the secondary image data in synchronization with the frame period; and an AF control unit that performs control of changing a focus distance of the image pickup lens, the image pickup method including: a step of receiving, by the input device, input of designating a position of an AF area in the primary image data displayed on the image display device; and a step of executing, by the image processing unit, a conversion process of projecting coordinates of the AF area in the primary image data onto coordinates in the secondary image data and displaying, on the image display device, the entire secondary image data and an AF area icon indicating the position of the AF area in the secondary image data if the coordinates of the AF area in the secondary image data are out of the cut-out area.

DETAILED DESCRIPTION OF THE PREFERRED EMBODIMENTS

Figure 1:
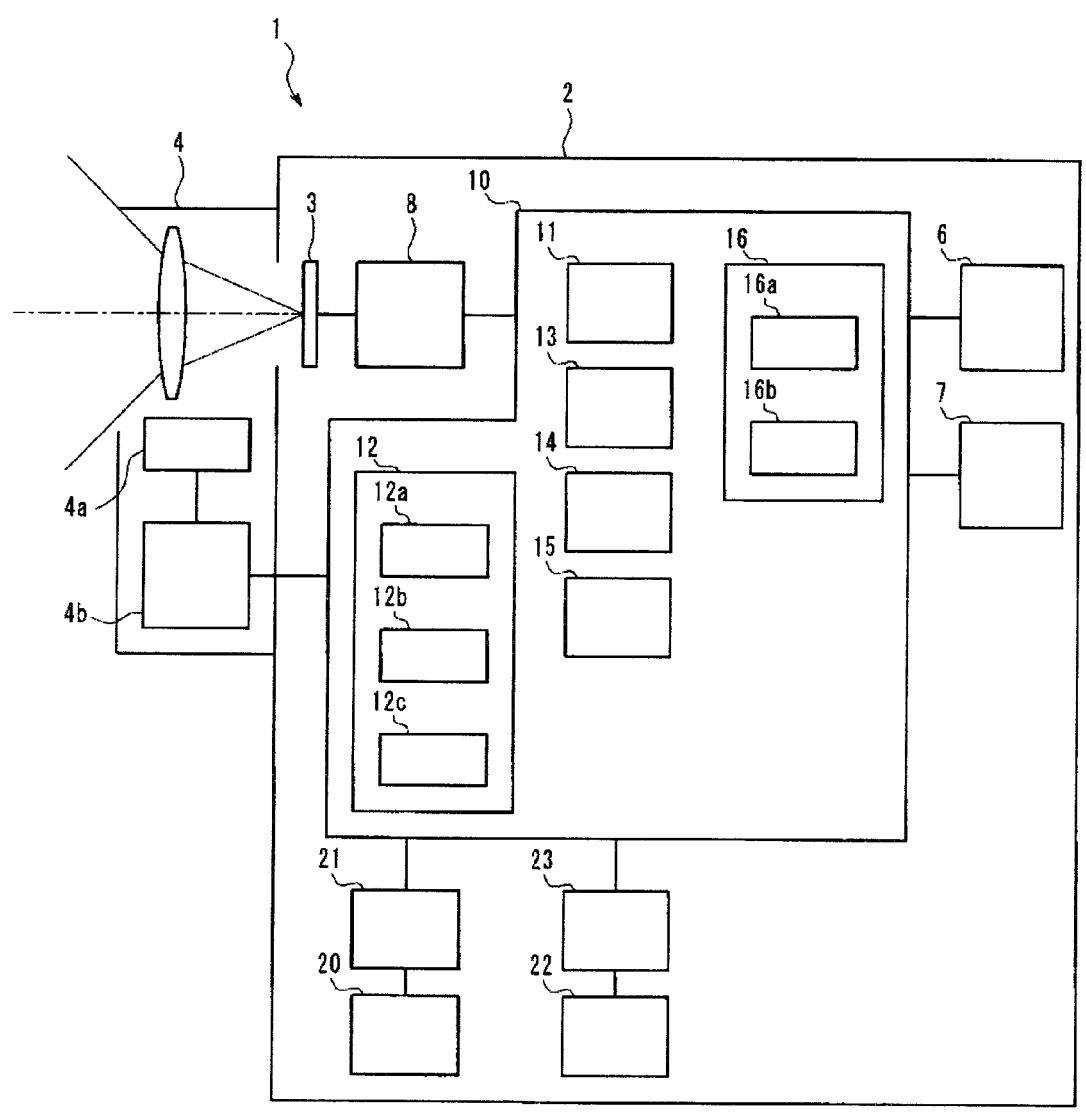
FIG. 1 is a block diagram describing a configuration of an image pickup apparatus according to a first embodiment.

The preferred embodiments of the present invention will now be described with reference to the drawings. Note that in each drawing used for the following description, scaling varies from one constituent element from another to make the size of each constituent element recognizable on the drawings. The present invention is not limited only to quantities of the constituent elements, shapes of the constituent elements, ratios of sizes of the constituent elements, and relative positional relationships between the constituent elements described in the drawings.

First Embodiment

Figure 2:
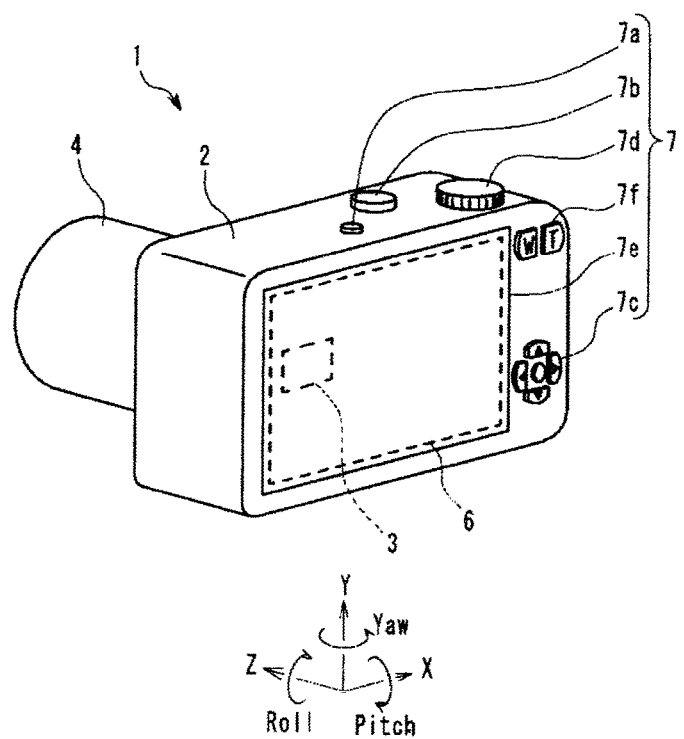
FIG. 2 is a perspective view of a back side of the image pickup apparatus according to the first embodiment.

As shown in FIGS. 1 and 2, an image pickup apparatus 1 includes an image pickup device 3, such as a CCD or CMOS image sensor, an image display device 6, an input device 7, and a control unit 10. In an example of the present embodiment, the image pickup apparatus 1 is in a form of a so-called digital camera including: a main body unit 2 that houses the image pickup device 3 and the control unit 10; and an image pickup lens 4 fixed to the main body unit 2, the digital camera storing electronic data of an optical image formed by the image pickup lens 4. Note that the image pickup apparatus 1 may be a so-called interchangeable lens digital camera in which the image pickup lens 4 can be removed from the main body unit 2 or may be an integrated lens digital camera in which the image pickup lens 4 cannot be removed from the main body unit 2.

For a definition of a posture direction of the image pickup apparatus 1, an optical axis direction of the image pickup lens 4 will be defined as a Z axis. A direction orthogonal to and horizontal to an optical axis when the image pickup apparatus 1 is in an upright state is an X axis, and a direction orthogonal to and perpendicular to the optical axis is a Y axis. To express directions of changes in the posture of the image pickup apparatus 1, a rotation direction around the X axis of the image pickup apparatus 1 will be called a pitch direction, a rotation direction around the Y axis will be called a yaw direction, and a rotation direction around the Z axis will be called a roll direction.

The image pickup device 3 has a rectangular light receiving surface. The light receiving surface of the image pickup device 3 is arranged to be orthogonal to the optical axis of the image pickup lens 4. The image pickup lens 4 includes an AF mechanism unit 4a that can perform autofocus action and that moves part or all of lenses to change a focus distance. In an example of the present embodiment, the image pickup lens 4 is so-called zoom lens that can alter a focal length. Zoom action of the image pickup lens 4 may be in a form of manual zoom performed by force inputted by a user or may be in a form of electric zoom performed by force generated by an electric motor incorporated into the image pickup lens 4.

The image pickup lens 4 of the present embodiment includes a focal length detection unit 4b that outputs information of a current focal length of the image pickup lens 4 to the control unit 10. A configuration of the focal length detection unit 4b is a well-known technique, such as a form of using a rotary encoder to detect the focal length and a form of counting the number of pulses for operating a stepping motor for zoom action. Note that the control unit 10 may include the focal length detection unit 4b when the image pickup apparatus 1 is an integrated lens type, for example.

The image pickup apparatus 1 may include a lens shutter mechanism or a focal plane shutter mechanism. The image pickup apparatus 1 may also include a diaphragm mechanism in the image pickup lens 4.

The image display device 6 includes, for example, a liquid crystal display device or an organic EL display device and displays images. An outer shape of a display surface of the image display device 6 according to the present embodiment is rectangular. The image display device 6 displays a graphical user interface (GUI) of the image pickup apparatus 1, a live view that functions as a finder during image pickup action, recorded image data, and the like.

In an example of the present embodiment, the image display device 6 is mounted on the main body unit 2. Note that the image display device 6 may be separated from the main body unit 2 and mounted on another electronic device connected to the main body unit 2 through wired communication or wireless communication.

The input device 7 includes one or a plurality of operation members, such as a lever switch, a dial switch, a button switch, and a touch sensor, for a user to input instructions for action of the image pickup apparatus 1.

In an example of the present embodiment, the input device 7 includes a power source operation switch 7a, a release switch 7b, a four-direction switch 7c, a dial switch 7d, a touch panel 7e, and a two-direction switch 7f. The touch panel 7e is mounted on a display surface of an image display device 15. Note that part or all of the input device 7 may be separated from the main body unit 2 and mounted on another electronic device connected to the main body unit 2 through wired communication or wireless communication.

The release switch 7b is a so-called two-stage press button switch including a first release switch and a second release switch operated based on different amounts of pressing or different pressing force. In the present embodiment, when the pressing force applied to the release switch 7b is increased, the first release switch enters an ON state first, and then the second release switch enters the ON state. A state in which only the first release switch is in the ON state is a so-called half-pressed state, and a state in which the second release switch is in the ON state is a so-called full-pressed state.

The control unit 10 includes a CPU (arithmetic unit) 11, a RAM (storage device) 12, a flash memory (auxiliary storage device) 13, an image processing unit 16, an input-output device, an electronic power control apparatus, and the like and controls action of the image pickup apparatus 1 described later based on predetermined programs. In the present embodiment, the control programs of the image pickup apparatus 1 are stored in a flash memory 13 or the like that is a non-volatile storage medium.

The control unit 10 is electrically connected to an image pickup device drive unit 8. The image pickup device drive unit 8 drives the image pickup device 3 according to control by the control unit 10. The image pickup device drive unit 8 converts a two-dimensional image signal outputted from the image pickup device 3 into primary image data that is a digital signal. An outer shape of an image generated based on the primary image data is rectangular. Hereinafter, the image generated based on a primary image will be simply called primary image data. As for coordinates in the primary image data, an axis in a vertical direction in a field of view when the image pickup apparatus 1 is held in the upright state is a y axis, and an axis in a horizontal direction in the field of view is an x axis. Note that although the image pickup device 3 and the image pickup device drive unit 8 are separate units in an example of the present embodiment, the image pickup device drive unit 8 may be integrated into the image pickup device 3.

The RAM 12 includes a plurality of storage areas of a control program 12a, an image data buffer 12b, and a log information buffer 12c. The control program 12a is a storage area for storing a control program read out from the flash memory 13 when power is applied to the image pickup apparatus 1.

The image data buffer 12b is a storage area for storing the primary image data outputted from the image pickup device drive unit 8 and secondary image data generated by the image processing unit 16 described later. Hereinafter, the data stored in the image data buffer 12b will be simply called image data when distinction between the primary image data and the secondary image data is not necessary.

Note that the image data buffer 12b may be a storage area provided in a video memory dedicated to image data handled by the image processing unit 16. The log information buffer 12c is a storage area for storing variables, AF position designation coordinates, and the like used in the execution of a trapezoidal distortion correction process described later.

An AF control unit 14 detects an image formation state of the image pickup lens 4 in a predetermined area of the light receiving surface of the image pickup device 3 and controls the autofocus action by the image pickup apparatus 1. More specifically, the AF control unit 14 changes the focus distance by controlling the AF mechanism unit 4a while detecting a contrast in an AF area that is a predetermined area in the primary image data to thereby put the image pickup lens 4 into a focused state. That is, the image pickup apparatus 1 of the present embodiment is capable of autofocus action that is generally called a contrast detection system. Note that the form of the autofocus action of the image pickup apparatus 1 is not limited to the contrast detection system. For example, the image pickup apparatus 1 may include the image pickup device 3 provided with a ranging sensor that detects a phase difference of an object image on the image pickup surface and may be capable of autofocus action that is generally called a phase difference detection system, in which the image pickup lens 4 is driven and put into the focused state based on phase difference information (defocus amount) detected by the ranging sensor.

In the present embodiment, coordinates of the AF area in the primary image data can be altered according to operation of the input device 7 by the user. In an example of the present embodiment, the user operates the input device 7, such as the touch panel 7e and the four-direction switch 7c, to alter the coordinates of the AF area in the primary image data.

Note that the control unit 10 may automatically alter the coordinates and a size of the AF area in the primary image data based on a predetermined program.

The AE control unit 15 controls an amount of exposure for the primary image data acquired from the image pickup device 3. The AE control unit 15 calculates an exposure value (an amount of exposure) based on an object luminance obtained from the primary image data.

The image processing unit 16 applies predetermined image processing to the image data stored in the image data buffer 12b. Hereinafter, the image data after the application of the image processing by the image processing unit 16 will be called secondary image data. The image processing unit 16 of the present embodiment includes a trapezoidal distortion correction coefficient calculation unit 16a and a correction processing unit 16b that apply a trapezoid correction described later to the image data.

The trapezoid correction coefficient calculation unit 16a uses a value of the focal length of the image pickup lens 4 obtained from the focal length detection unit 4b and values of correction angles described later inputted through the input device 7 to calculate correction coefficients necessary to execute arithmetic processing of trapezoid correction. The correction processing unit 16b applies an image interpolation process involving coordinate conversion to the primary image data based on the correction coefficients calculated by the trapezoid correction coefficient calculation unit 16a. In the image interpolation process, an image interpolation process, such as bicubic interpolation and bilinear interpolation, is carried out.

Note that in an example of the present embodiment, functional configurations of the AF control unit 14, the AE control unit 15, and the image processing unit 16 described above are included in the control unit 10. Note that dedicated hardware, such as dedicated processor circuits that execute each function, may be used as the functional configurations of the AF control unit 14, the AE control unit 15, and the image processing unit 16.

The image pickup apparatus 1 of the present embodiment includes: a power source connection unit 21 connected to a power source 20, such as a commercial power source, an AC adapter, and a battery; and a storage medium connection unit 23 connected to a storage medium 22, such as a flash memory card. In an example of the present embodiment, the power source 20 is a battery and is housed in the main body unit 2 in a manner that the power source 20 can be attached and detached. In an example of the present embodiment, the storage medium 22 is a flash memory card and is housed in the main body unit 2 in a manner that the storage medium 22 can be attached and detached. Note that the battery that is the power source 20 and the storage medium 22 may be fixed in the main body unit 2. The storage medium 22 may be separated from the main body unit 2 and mounted on another electronic device connected to the main body unit 2 through wired communication or wireless communication.

A trapezoid correction process executed in the image processing unit 16 will be described with reference to a flowchart shown in FIG. 4. In summary, the trapezoid collection process is a process of applying a geometric modification process for correcting a trapezoidal distortion to the primary image data picked up at a position not facing parallel to an object, to generate the secondary image data that looks as if the image is picked up from a virtual viewpoint facing parallel to the object.

To simplify the description of the geometric modification process for correcting the trapezoidal distortion, a case in which a posture of the image pickup apparatus 1 is arranged at a position forming a predetermined angle in a pitch direction (direction with an inclination angle in an up-down direction) relative to the position facing parallel to the object will be described.

Figure 5:
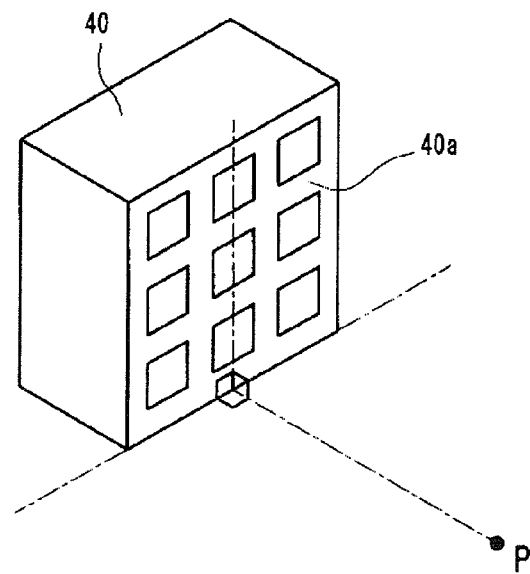
FIG. 5 is a diagram for describing the trapezoid correction process.
Figure 6:
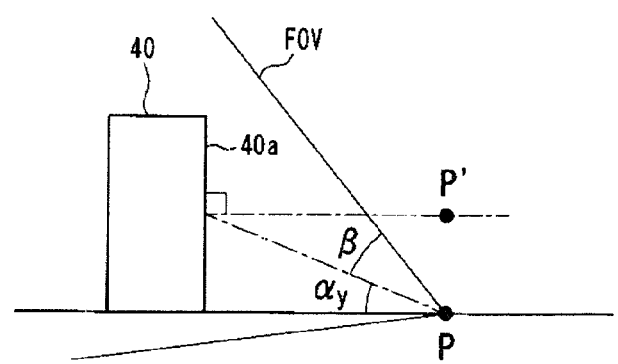
FIG. 6 is a diagram for describing the trapezoid correction process.
Figure 7:
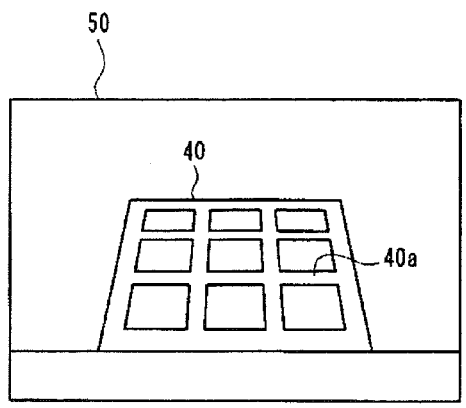
FIG. 7 is a diagram for describing the trapezoid correction process.

For example, when the image pickup apparatus 1 picks up an image so as to look up at a rectangular front surface 40a of a building 40 from a real viewpoint P close to the ground as shown in FIGS. 5 and 6, the front surface 40a is distorted into a trapezoidal shape tapered upward on primary image data 50 as shown in FIG. 7. In this case, in the image-pickup from the real viewpoint P, the image pickup apparatus 1 is in a posture in which the optical axis of the image pickup lens 4 faces upward by a first angle αy in the pitch direction from a horizontal line. The reason that the front surface 40a is distorted on the primary image data 50 is that the distance from the image pickup apparatus 1 to the front surface 40a increases from the lower side to the upper side, and the shooting magnification changes in the up-down direction.

Figure 8:
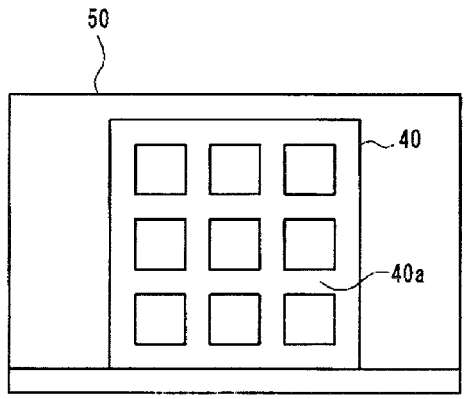
FIG. 8 is a diagram for describing the trapezoid correction process.

On the other hand, when an image is picked up by arranging the image pickup apparatus 1 at a virtual viewpoint P' facing parallel to the front surface 40a of the building 40, the front surface 40a is rectangular on the primary image data 50 as shown in FIG. 8.

Figure 9:
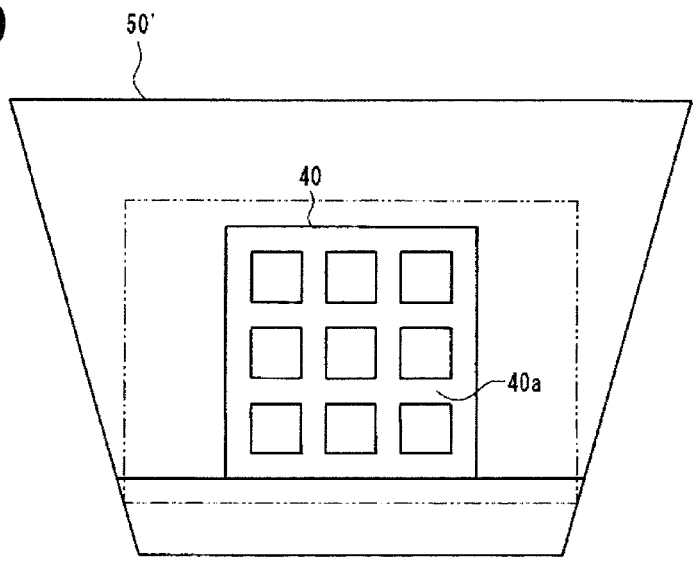
FIG. 9 is a diagram for describing the trapezoid correction process.

In the trapezoid correction process, secondary image data 50' is obtained by modifying the primary image data 50 such that the shape of an object image in the primary image data 50 picked up from the real viewpoint P becomes similar to the shape of an object image photographed from the virtual viewpoint P' that is a virtual viewpoint as shown in FIG. 9. In other words, the primary image data 50 on a plane A parallel to the light receiving surface of the image pickup device 3 is projected onto a plane B inclined by the first angle αy from the plane A in the pitch direction to obtain the secondary image data 50' subjected to the trapezoid correction process.

More specifically, in the trapezoid correction process, a value of a focal length f of the image pickup lens 4 is acquired from the focal length detection unit 4b and stored in the log information buffer 12c of the RAM 12 in step S31.

In step S32, correction angles are acquired and stored in the log information buffer 12c of the RAM 12. The correction angles here include values of two angles, the first angle αy that is the angle formed in the pitch direction relative to the light receiving surface of the image pickup device 3 as described above and a second angle αx that is an angle formed in the yaw direction relative to the light receiving surface of the image pickup device 3.

The user operates the input device 7 to set the values of the correction angles. For example, the user operates the four-direction switch 7c in an up-down direction to increase or decrease the value of the first angle αy, and the user operates the four-direction switch 7c in a left-right direction to increase or decrease the value of the second angle αx. For example, the values of the first angle αy and the second angle αx may be increased or decreased according to a direction of drag operation by the user tracing over the touch panel 7e. The values of the correction angles may be continuously changed or may be changed in steps.

In step S33, the value of the focal length f and the values of the correction angles stored in the log information buffer 12c are used to apply the trapezoid correction process to the primary image data 50 to generate the secondary image data 50'.

The following expression (1) is an expression indicating a relationship between coordinates (x, y) of the primary image data 50 of the plane A and coordinates (x', y') of the secondary image data 50' of the plane B inclined by an angle α from the plane A in the pitch direction.

$$y=\{H\cdot k1\cdot y'\}/\{H-k2\cdot y'\}$$

$$x=\{H\cdot x'\}/\{H-k2\cdot y'\} \quad \text{[Expression 1]}$$

where, k1 and k2 are conversion coefficients and are as follows, $$k1=\cos\alpha-\sin\alpha\cdot\tan\beta$$

$$k2=H-2\sin\alpha\cdot\tan\beta$$

H represents the number of pixels of a predetermined side of an effective pixel area of the image pickup device 3 corresponding to the correction angles inputted by the user through the input device 7. For example, as shown in FIG. 7, in the correction of the trapezoidal distortion in the up-down direction of the field of view after the image is taken with long sides of the effective pixel area of the image pickup device 3 being horizontal, H is the number of pixels in a short side direction of the effective pixel area of the image pickup device 3. More specifically, the number of pixels corresponding to H is a result obtained by dividing the length in the short side direction of the effective pixel area of the image pickup device 3 by a length (pixel pitch) per pixel in the image pickup device 3. Although not shown, in the correction of the trapezoidal distortion in the left-right direction of the field of view after the image is taken with the long sides of the effective pixel area of the image pickup device 3 being horizontal, H is the number of pixels in a long side direction of the effective pixel area of the image pickup device 3. In this case, the number of pixels corresponding to H is a result obtained by dividing the length in the long side direction of the effective pixel area of the image pickup device 3 by the length (pixel pitch) per pixel in the image pickup device 3.

An angle β is calculated by the following equation (2).

$$\beta = \arctan\{L/(2 \cdot f)\} \quad \text{[Equation 2]}$$

L represents a length (indicated in mm) of a predetermined side of the effective pixel area of the image pickup device 3 corresponding to the correction angles inputted by the user through the input device 7. For example, as shown in FIG. 7, in the correction of the trapezoidal distortion in the up-down direction of the field of view after the image is taken with the long sides of the effective pixel area of the image pickup device 3 being horizontal, L is a length in the short side direction of the effective pixel area of the image pickup device 3. Although not shown, in the correction of the trapezoidal distortion in the left-right direction of the field of view after the image is taken with the long sides of the effective pixel area of the image pickup device 3 being horizontal, L is a length in the long side direction of the effective pixel area of the image pickup device 3. In the equation, f represents a focal length (indicated in mm) of the image pickup lens 4. That is, the angle β is a value half the angle of view in the direction of correcting the trapezoidal distortion of the image pickup apparatus 1.

Note that the value of the focal length f may be a value inputted by the user through the input device 7. For example, when the image pickup apparatus 1 is an interchangeable lens type and includes the image pickup lens 4 that cannot acquire the focal length information, the user can input the value of focal length f to carry out the trapezoid correction desired by the user. Trapezoid correction that generates a perspective intended by the user can be performed by allowing the user to input the value of the focal length f. Note that when the user can input the value of the focal length f, means for selecting and using one of the value acquired from the image pickup lens 4 and the value inputted by the user to execute the trapezoid correction may be provided.

In step S33, expression (1) and equation (2) are used to apply the trapezoid correction process in the short side direction to the primary image data 50 to generate the secondary image data 50'. The coordinates (x', y') of the secondary image data after the trapezoid correction are calculated by inversely calculating a relational expression with respect to the coordinates (x, y) of the primary image data 50 indicated by expression (1). More specifically, expression (1) and equation (2) are used to define a relational expression of the coordinates (x, y) of the primary image data 50 with respect to the coordinates (x', y') of the secondary image data after the trapezoid correction in step S33. The defined relational expression based on expression (1) is inversely calculated to obtain the coordinates (x', y') of the secondary image data 50' from the inputted coordinates (x, y) of the primary image data 50. The trapezoid correction process in the short side direction (y direction in the example of FIG. 7) is applied to the primary image data 50 as shown for example in FIG. 7 according to the input of the correction angles in the pitch direction, and the secondary image data 50' as shown in FIG. 9 is generated.

The operation in which the trapezoid correction process is executed in the vertical direction (pitch direction) in the field of view is described in the foregoing illustration. Note that the trapezoid correction process is similarly executed in the horizontal direction (yaw direction) in the field of view. In the trapezoid correction process of this case, for example, trapezoid correction is executed such that the primary image data photographed from the real viewpoint P, in which the angle in the horizontal direction formed by the front surface 40a of the building 40 and the optical axis of the image pickup lens 4 is not a right angle, is approximated to the image photographed from the virtual viewpoint P' facing parallel to the front surface 40a of the building 40. Under the shooting conditions, the rectangular front surface 40a of the building 40 is asymmetric in the left-right direction in the primary image data. In the trapezoid correction process of this case, a modification process of projecting the primary image data 50 or the secondary image data 50' subjected to the trapezoid correction process in the pitch direction onto the plane B inclined by the second angle αx from the plane A in the yaw direction is applied to set the secondary image data 50'. More specifically, the coordinates (x', y') of the secondary image data 50' of the plane B inclined by the second angle αx from the plane A in the yaw direction indicate a relational expression in which variables (x, y) of the coordinates regarding the primary image in expression (1) are replaced by (y, x), and variables (x', y') of the coordinates regarding the secondary image are replaced by (y', x'). L [mm] regarding the value of β in equation (2) is the length in the long side direction of the effective pixel area of the image pickup device 3.

As described, the image processing unit 16 of the present embodiment generates the secondary image data obtained by applying the modification process of projecting the primary image data 50 onto the plane B forming the first angle αy in the pitch direction relative to the plane A parallel to the light receiving surface of the image pickup device 3 and forming the second angle αx in the yaw direction relative to the light receiving surface.

Note that details of the image processing necessary to generate the trapezoid correction process described above are well-known techniques, and the details will not be described.

Figure 3:
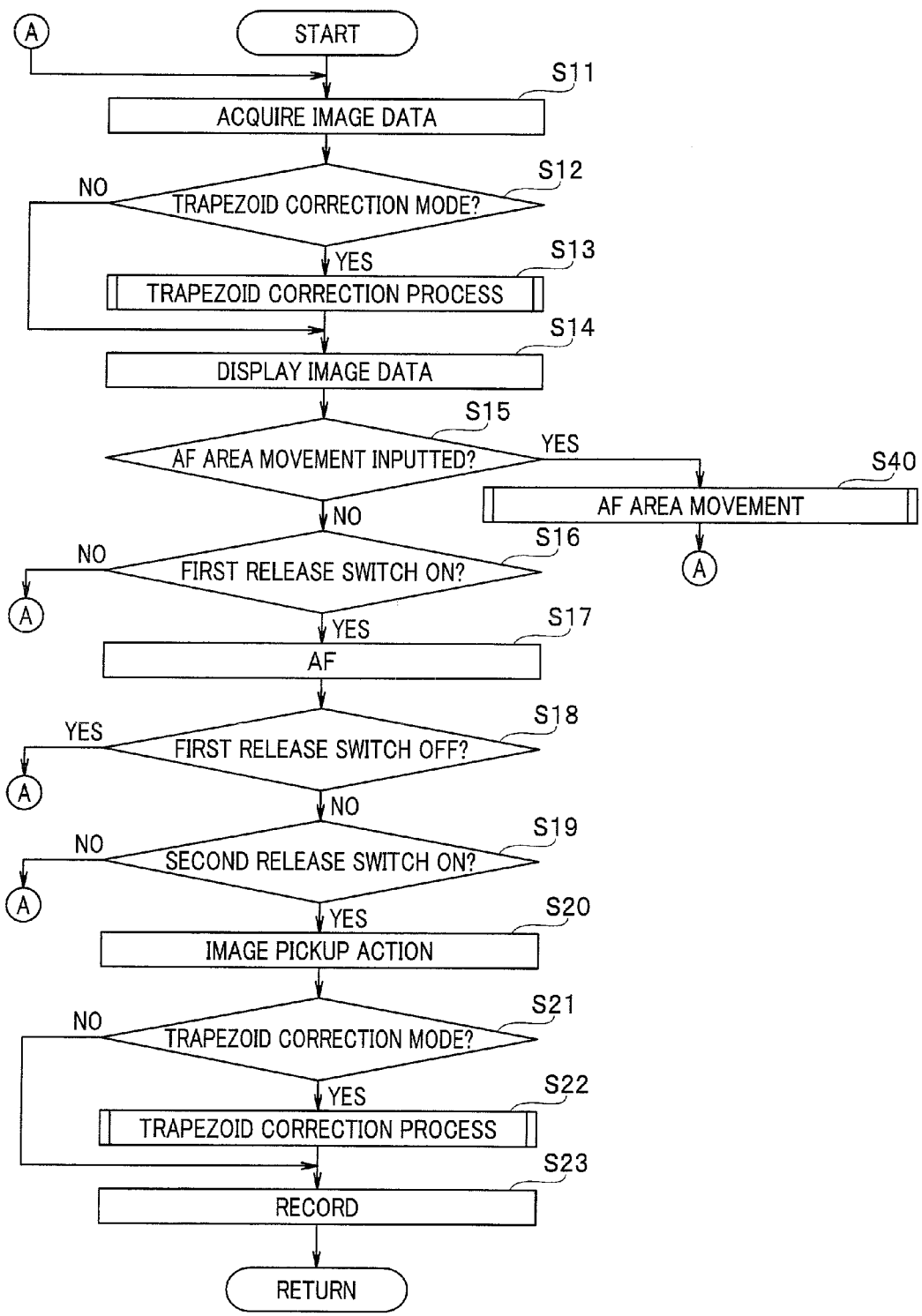
FIG. 3 is a flowchart of image pickup action of the image pickup apparatus according to the first embodiment.

Action of the image pickup apparatus 1 with the configuration described above will be described. A flowchart shown in FIG. 3 illustrates action when the power source of the image pickup apparatus 1 is in the on-state, and the mode is an image pickup action mode. In the image pickup action mode, live view display action is performed in an initial state, in which the primary image data is acquired from the image pickup device 3 at each predetermined frame period, and the secondary image data subjected to image processing by the image processing unit 16 is sequentially displayed by the image display device 6. In the image pickup action mode, the image pickup apparatus 1 executes action of storing an object image in the storage medium 22 as electronic data according to operation inputted to the release switch 7b. Note that the image pickup apparatus 1 may be able to execute a reproduction mode for reproducing and displaying the electronic data of the image stored in the storage medium 22 on the image display device 6.

The image pickup action mode ends, for example, when the user operates the power source operation switch 7a to input an instruction for putting the image pickup apparatus 1 into a resting state, when operation for switching to another action mode is inputted, or when the control unit 10 judges to move to the resting state. The determination process of ending the image pickup action mode is not described in the flowchart of FIG. 3.

In the image pickup action mode, electric power is supplied to the image pickup device 3 and the image pickup device drive unit 8. To perform the live view display action, the primary image data 50 is acquired from the image pickup device 3 at a predetermined frame period. In the image pickup action mode, the primary image data 50 outputted from the image pickup device drive unit 8 is stored in the image data buffer 12b of the RAM 12 in step S11.

In step S12, whether a trapezoid correction mode is selected by the user is determined. The trapezoid correction mode is an action mode in which the image pickup apparatus 1 uses the image processing unit 16 to apply the trapezoid correction process described above to the primary image data 50. The user operates the four-direction switch 7c or the touch panel 7e on a GUI displayed on the image display device 6 to switch whether to select the trapezoid correction mode, for example.

Figure 4:
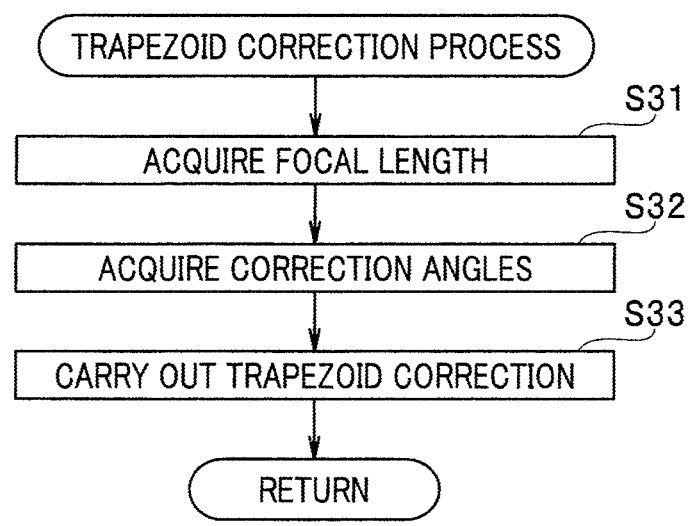
FIG. 4 is a flowchart of a trapezoid correction process.

If it is determined that the trapezoid correction mode is selected by the user in step S12, the trapezoid correction process shown in FIG. 4 is executed in step S13, and the process moves to step S14. As a result of the execution of step S13, the secondary image data 50' obtained by applying the trapezoid correction process to the primary image data 50 is stored in the image data buffer 12b.

On the other hand, if it is determined that the trapezoid correction mode is not selected by the user in step S12, step S13 is skipped, and the process moves to step S14.

In step S14, the image data stored in the image data buffer 12b of the RAM 12 is displayed on the image display device 6. If step S13 is skipped, the primary image data 50 not subjected to the trapezoid correction process is displayed on the image display device 6 in step S14. On the other hand, if step S13 is executed, the secondary image data 50' subjected to the trapezoid correction process is displayed on the image display device 6.

In the secondary image data 50' subjected to the trapezoid correction process, the field of view of the image pickup apparatus 1 is not rectangular as shown in FIG. 9. In step S14, the entire secondary image data 50' may be displayed on the image display device 6, or the secondary image data 50' may be trimmed into a rectangular area as indicated by an alternate long and two short dashes line in FIG. 9 to display the part of the area on the image display device 6.

In step S15, whether an instruction for moving the AF area is inputted through the input device 7 is determined. As described, the user operates the input device 7, such as the touch panel 7e and the four-direction switch 7c, to input the instruction for moving the AF area in the present embodiment. In an example of the present embodiment, the control unit 10 determines that the instruction for moving the AF area is inputted when the user taps inside of an area of the image data displayed on the image display device 6. In the present embodiment, the control unit 10 recognizes, as AF position designation coordinates, coordinates in the image data corresponding to the position tapped by the user.

Figure 11:
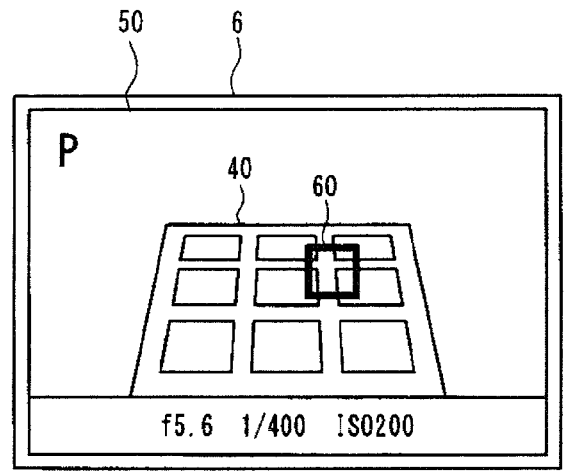
FIG. 11 is a diagram showing an example of display of an AF area display icon according to the first embodiment.

In an example of the present embodiment, a shape of an AF area icon 60 in the image displayed on the image display device 6 is a square or a rectangle surrounded by four sides parallel to four sides of the outer shape of the rectangular display surface of the image display device 6 as shown in FIG. 11, regardless of whether the trapezoid correction process is applied to the image data displayed on the image display device 6 in step S14.

Figure 10:
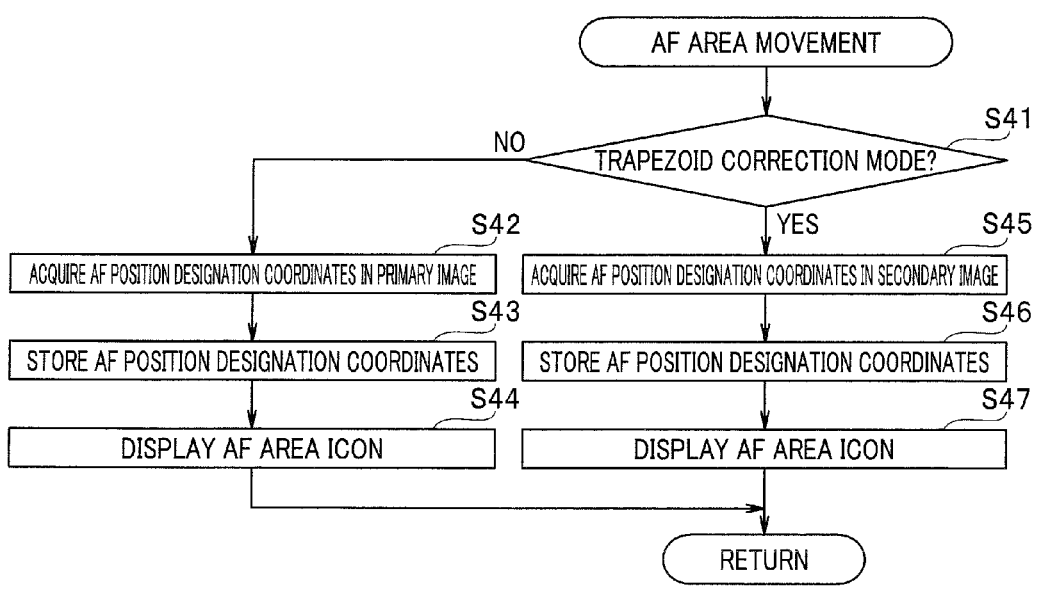
FIG. 10 is a flowchart of an AF area movement process according to the first embodiment.

If it is determined that the instruction for moving the AF area is inputted in step S15, the process moves to step S40. In step 40, an AF area movement process shown in a flowchart of FIG. 10 is executed.

In the AF area movement process, whether the trapezoid correction mode is selected by the user is determined in step S41. If it is determined that the trapezoid correction mode is not selected by the user in step S41, the process moves to step S42.

In step S42, the AF position designation coordinates inputted by the user through the input device 7 are acquired. Since the trapezoid correction mode is not executed, the primary image data 50 not subjected to the trapezoid correction process is displayed on the image display device 6. Therefore, the AF position designation coordinates in step S42 are expressed by the coordinates (x, y) of the primary image data 50 of the plane A.

In step S43, the AF position designation coordinates are stored in the log information buffer 12c of the RAM 12. In step S44, the AF area icon 60 indicating the position of the AF area is superimposed and displayed at the AF position designation coordinates in the primary image data 50 displayed on the image display device 6 as shown in FIG. 11. After the execution of step S44, the process returns to step S11 of FIG. 3.

On the other hand, if it is determined that the trapezoid correction mode is selected by the user in step S41 of the AF area movement process, the process moves to step S45.

In step S45, the AF position designation coordinates inputted by the user through the input device 7 are acquired. Since the trapezoid correction mode is executed, the secondary image data 50' subjected to the trapezoid correction process is displayed on the image display device 6. Therefore, the AF position designation coordinates in step S45 are expressed by the coordinates (x', y') of the secondary image data 50' of the plane B inclined by the angle α from the plane A in the pitch direction.

Figure 12:
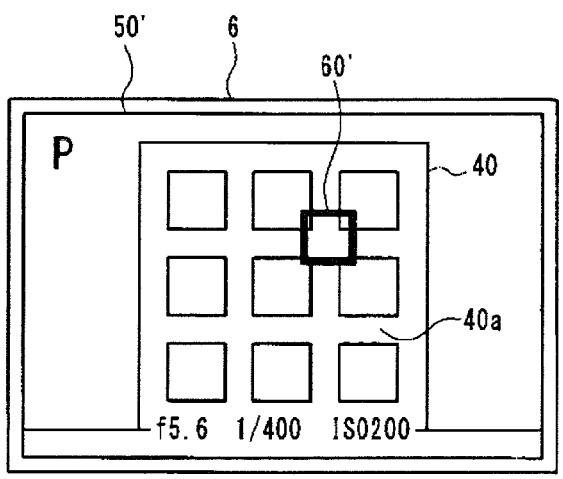
FIG. 12 is a diagram showing an example of display of the AF area display icon according to the first embodiment.

In step S46, the AF position designation coordinates are stored in the log information buffer 12c of the RAM 12. In step S47, the AF area icon 60 indicating the position of the AF area is superimposed and displayed at the AF position designation coordinates in the secondary image data 50' displayed on the image display device 6 as shown in FIG. 12. After the execution of step S47, the process returns to step S11 of FIG. 3.

On the other hand, if it is determined that the instruction for moving the AF area is not inputted in step S15, the process moves to step S16.

In step S16, whether the first release switch of the release switch 7b is in the ON state is determined. That is, whether the release switch 7b is in the half-pressed state is determined.

If it is determined that the first release switch of the release switch 7b is in the OFF state in step S16, the process returns to step S11. That is, the action from step S11 to step S15 is repeatedly executed in synchronization with the predetermined frame period until the release switch 7b is operated. The action from step S11 to step S15 is repeated in synchronization with the predetermined frame period, and as a result, live view action is performed in which the primary image data 50 or the secondary image data 50' displayed on the image display device 6 is always updated. As a result of the repetition of the action from step S11 to step S15 in synchronization with the predetermined frame period, the AF position designation coordinates are altered according to the operation inputted to the input device 7 by the user, and the position of the AF area icon 60 in the live view display is changed according to the change in the AF position designation coordinates.

Figure 13:
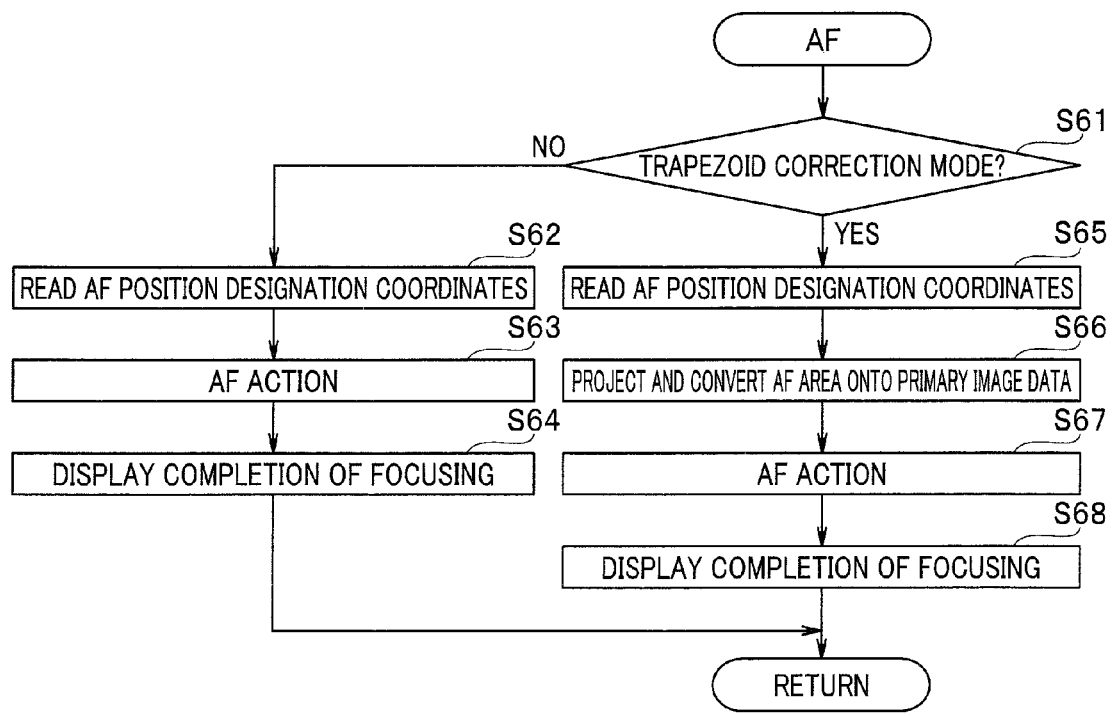
FIG. 13 is a flowchart of AF processing according to the first embodiment.

On the other hand, if it is determined that the first release switch of the release switch 7b is in the ON state in step S16, the process moves to step S17. In step S17, AF processing of a flowchart shown in FIG. 13 is executed.

In the AF processing, whether the trapezoid correction mode is selected by the user is determined as shown in step S61.

If it is determined that the trapezoid correction mode is not selected by the user in step S61, the process moves to step S62.

In step S62, the AF position designation coordinates in the primary image data 50 stored in the log information buffer 12c of the RAM are read. In step S63, the AF control unit 14 changes the focus distance by controlling the AF mechanism unit 4a while detecting the contrast value in the AF area around the AF position designation coordinates in the primary image data 50 to thereby put the image pickup lens 4 into the focused state. Note that if the image pickup apparatus 1 is capable of autofocus action of the phase difference detection system, the autofocus action is performed by using the phase difference information detected by the ranging sensor in the AF area around the AF position designation coordinates. In step S64, the color of the AF area icon 60 displayed on the image display device 6 is changed to indicate that the image pickup lens 4 is in the focused state, for example.

On the other hand, if it is determined that the trapezoid correction mode is selected by the user in step S61, the process moves to step S65.

In step S65, the AF position designation coordinates in the secondary image data 50' stored in the log information buffer 12c of the RAM are read. In step S66, a conversion process is executed in which the AF position designation coordinates in the secondary image data 50' and the square or rectangular AF area in the secondary image data 50' are projected onto the primary image data 50. The conversion process is executed by using expression (1) of the trapezoid correction process described above.

Figure 14:
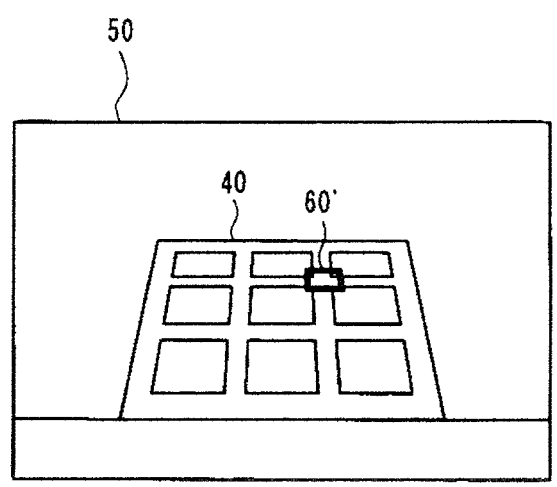
FIG. 14 is a diagram showing an example of a shape of an AF area in primary image data according to the first embodiment.

For example, the AF area indicated by a square AF area icon 60' displayed by the image display device 6 as shown in FIG. 12 has a shape different from the square in the primary image data 50 as shown in FIG. 14 as a result of the execution of step S66.

In step S67, the AF control unit 14 changes the focus distance by controlling the AF mechanism unit 4a while detecting the contract value or the phase difference information in the AF area in the primary image data 50 calculated in step S66 to thereby put the image pickup lens 4 into the focused state. In step S68, the color of the AF area icon 60' displayed on the image display device 6 is changed to indicate that the image pickup lens 4 is in the focused state, for example.

After the execution of the AF processing, the process moves to step S18. In step S18, whether the first release switch of the release switch 7b is in the OFF state is determined. If it is determined that the first release switch of the release switch 7b is in the OFF state in step S18, it is judged that the user has stopped the framing operation, and the process returns to step S11 again.

On the other hand, if it is determined that the first release switch of the release switch 7b is in the ON state in step S18, the process moves to step S19. In step S19, whether the second release switch of the release switch 7b is in the ON state is determined.

If it is determined that the second release switch of the release switch 7b is in the OFF state in step S19, the process returns to step S11.

On the other hand, if it is determined that the second release switch of the release switch 7b is in the ON state in step S19, the process moves to step S20 to execute image pickup action. In the image pickup action, the image pickup device 3 is driven to pick up an image by using the exposure value calculated by the AE control unit 15, and the obtained image data is stored as image pickup image data in the image data buffer 12b.

In step S21, whether the trapezoid correction mode is selected by the user is determined. If it is determined that the trapezoid correction mode is selected by the user in step S21, the process moves to step S22 to apply the trapezoid correction process described above to the image pickup image data. In step S23, the image pickup image data subjected to the trapezoid correction process is stored in the storage medium 22 as an electronic file in a predetermined format.

On the other hand, if it is determined that the trapezoid correction mode is not selected by the user in step S21, the process skips step S22 and moves to step S23, and the image pickup image data is stored in the storage medium 22 as an electronic file in a predetermined format.

As described, the image pickup apparatus 1 of the present embodiment includes: the image pickup device 3 that acquires the primary image data at each predetermined frame period; the focal length detection unit 4b that acquires the focal length of the image pickup lens 4 in synchronization with the frame period; the input device 7 that inputs the correction angles including two values including the first angle $\alpha y$ that is an angle formed in the pitch direction relative to the light receiving surface of the image pickup device 3 and the second angle $\alpha x$ that is an angle formed in the yaw direction relative to the light receiving surface; the image processing unit 16 that uses the value of the focal length and the values of the correction angles in synchronization with the frame period to generate the secondary image data obtained by applying the modification process of projecting the primary image data on the plane forming the first angle $\alpha y$ in the pitch direction relative to the light receiving surface and forming the second angle $\alpha x$ in the yaw direction relative to the light receiving surface; and the image display device 6 that displays the image based on the secondary image data in synchronization with the frame period.

According to the image pickup apparatus 1 of the present embodiment with the configuration, the trapezoid correction process of correcting the trapezoidal distortion of the object can be executed in two directions, the pitch direction and the yaw direction, of the image pickup apparatus 1. The user can operate the input device 7 to freely alter the degrees (correction angles) of the trapezoid correction process. In the present embodiment, the secondary image data 50' that is a result of applying the trapezoid correction process is displayed on the image display device 6 as a live view, and the result of altering the correction angles is immediately reflected on the display of the live view. Therefore, the user can use the image pickup apparatus 1 of the present embodiment to apply the trapezoid correction process to the image as intended.

The image pickup apparatus 1 of the present embodiment further includes the AF control unit 14 that performs control of changing the focus distance of the image pickup lens 4. The input device 7 receives the input of designating the position of the AF area in the secondary image data displayed on the image display device 6. The image processing unit 16 executes the conversion process of projecting the position of the AF area in the secondary image data onto the plane including the primary image data. The AF control unit 14 changes the focus distance of the image pickup lens 4 such that the image pickup lens 4 enters the focused state at the position corresponding to the AF area projected onto the plane including the primary image data, on the light receiving surface of the image pickup device 3.

According to the image pickup apparatus 1 of the present embodiment, the user can operate the input device 7 while checking the live view of the secondary image data 50' subjected to the trapezoid correction process displayed on the image display device 6 to thereby move the position of the AF area that is an area for performing autofocus. The position of the AF area inputted by the user is converted into the coordinates in the primary image data 50 before the trapezoid correction process is applied, and the autofocus action is executed based on the coordinates. Therefore, according to the present embodiment, the AF area at the position in the object designated by the user is not dislocated from the object as a result of the trapezoid correction process, and an image subjected to the trapezoid correction process as intended by the user can be picked up.

Second Embodiment

A second embodiment of the present invention will be described. Only differences from the first embodiment will be described below. The same constituent elements as in the first embodiment are designated with the same reference signs, and the description will be appropriately skipped.

In the first embodiment, the AF area is a square or a rectangle surrounded by four sides parallel to four sides of the rectangular outer shape of the display surface of the image display device 6 in the live view display displayed on the image display device 6.

On the other hand, in the present embodiment, the AF area is a square or a rectangular surrounded by four sides parallel to four sides of the rectangular outer shape of the primary image data in the primary image data. That is, the AF area is equivalent to an area surrounded by four sides parallel to four sides of the outer shape of the light receiving surface on the light receiving surface of the image pickup device 3.

Therefore, contents of the AF area movement process of step S40 and the AF processing of step S17 are different from the first embodiment in the present embodiment.

Figure 15:
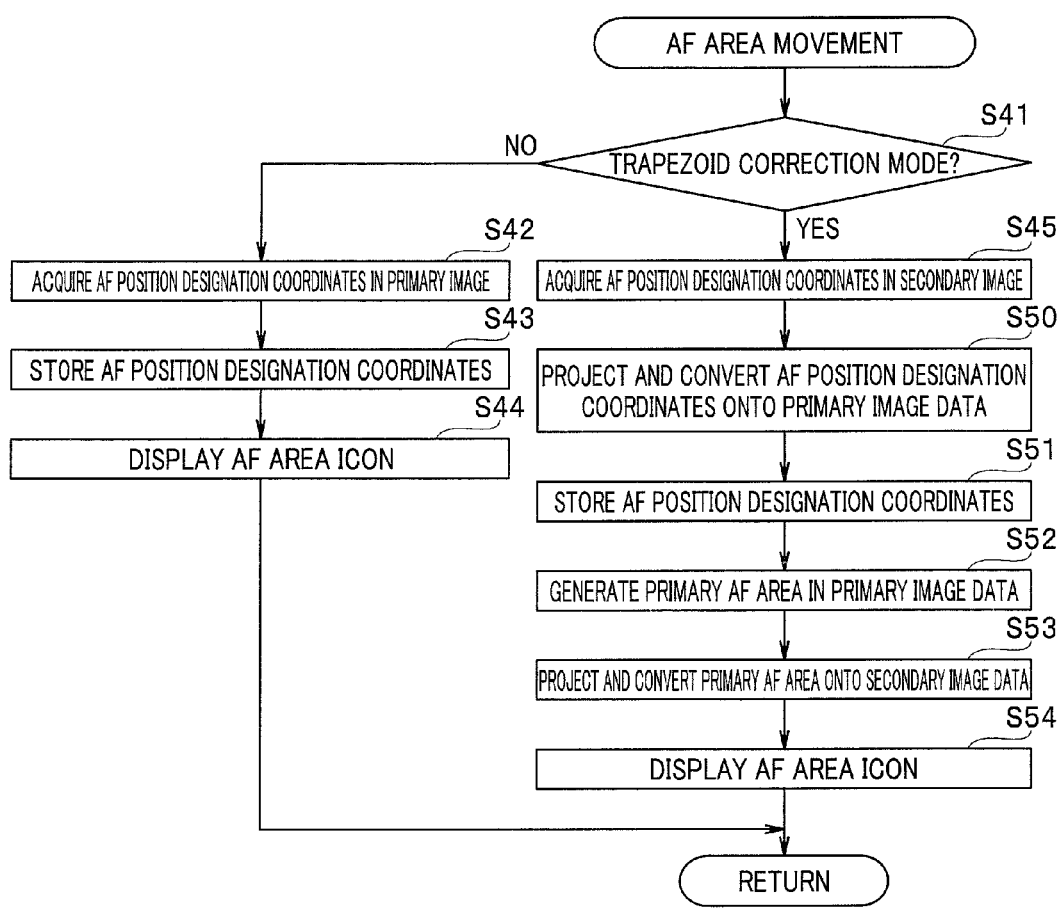
FIG. 15 is a flowchart of an AF area movement process according to a second embodiment.

FIG. 15 is a flowchart of an AF area movement process by the image pickup apparatus 1 of the present embodiment. In the AF area movement process of the present embodiment, whether the trapezoid correction mode is selected by the user is determined in step S41. If it is determined that the trapezoid correction mode is not selected by the user in step S41, the process moves to step S42.

The action from step S42 to step S44 performed when the trapezoid correction mode is not selected by the user is the same as in the first embodiment. After the execution of step S44, the process returns to step S11 of FIG. 3.

On the other hand, if it is determined that the trapezoid correction mode is selected by the user in step S42, the process moves to step S45.

In step S45, the AF position designation coordinates inputted by the user through the input device 7 are acquired. Since the trapezoid correction mode is executed, the secondary image data 50' subjected to the trapezoid correction process is displayed on the image display device 6. Therefore, the AF position designation coordinates in step S45 are expressed by the coordinates (x', y') of the secondary image data 50' of the plane B inclined by the angle α from the plane A in the pitch direction.

In step S50, a conversion process of projecting the AF position designation coordinates in the secondary image data 50' onto the primary image data 50 is executed. The conversion process is executed by using expression (1) of the trapezoid correction process described above. As a result of the execution of step S50, the AF position designation coordinates are expressed by the coordinates (x, y) of the primary image data 50 of the plane A. In step S51, the AF position designation coordinates in the primary image data 50 are stored in the log information buffer 12c of the RAM.

Figure 16:
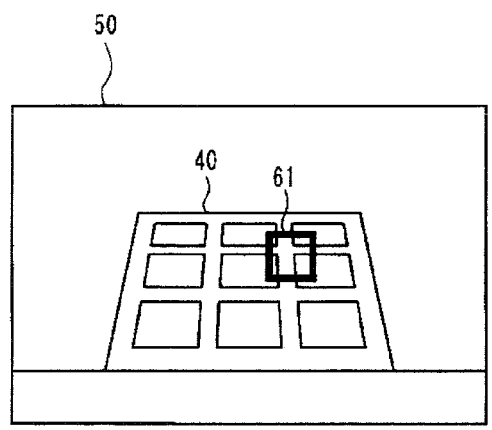
FIG. 16 is a diagram showing an example of a shape of an AF area in primary image data according to the second embodiment.
Figure 17:
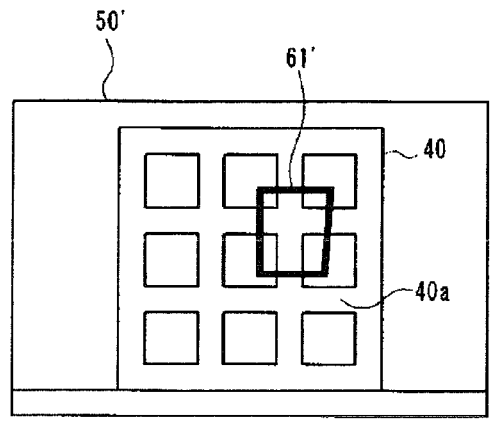
FIG. 17 is a diagram showing an example of a shape of an AF area in secondary image data according to the second embodiment.

In step S52, a square or rectangular primary AF area 61 in a predetermined size around the AF position designation coordinates calculated in step S50 is generated in the primary image 50 as shown in FIG. 16. In step S53, a conversion process of generating a secondary AF area 61' is executed, in which the primary AF area 61 in the primary image 60 is projected onto the secondary image data 50'. The conversion process is executed by using an expression obtained by modifying expression (1) of the trapezoid correction process described above to obtain the coordinates (x', y') of the secondary image data from the coordinates (x, y) of the primary image data. As shown in FIG. 17, the shape of the secondary AF area 61' in the secondary image data 50' is different from the primary AF area 61 according to the result of the trapezoid correction process.

Figure 18:
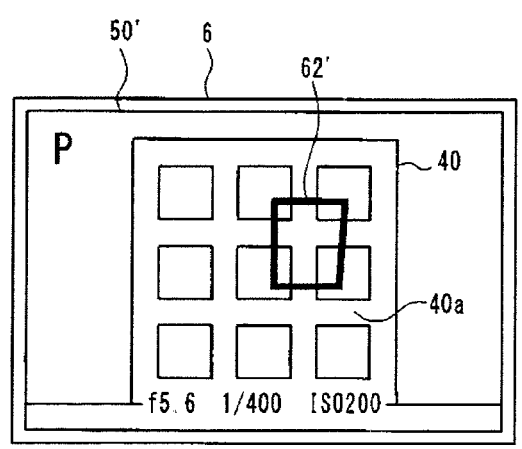
FIG. 18 is a diagram showing an example of display of an AF area display icon according to the second embodiment.

In step S54, an AF area icon 62' indicating the secondary AF area 61' is superimposed and displayed at the AF position designation coordinates in the secondary image data 50' displayed on the image display device 6 as shown in FIG. 18. After the execution of step S54, the process returns to step S11 of FIG. 3.

Figure 19:
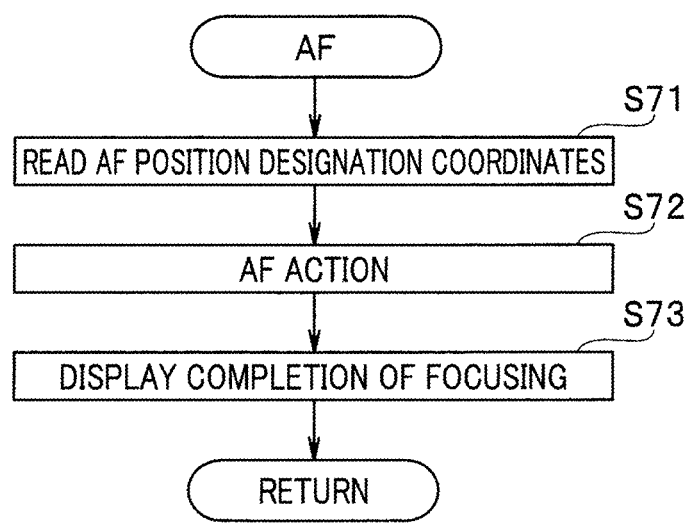
FIG. 19 is a flowchart of AF processing according to the second embodiment.

FIG. 19 is a flowchart of the AF processing by the image pickup apparatus 1 of the present embodiment. In the AF processing of the present embodiment, the AF position designation coordinates in the primary image data 50 stored in the log information buffer 12c of the RAM are read in step S71.

In step S72, the AF control unit 14 changes the focus distance by controlling the AF mechanism unit 4a while detecting the contrast value in the AF area around the AF position designation coordinates in the primary image data 50 to thereby put the image pickup lens 4 into the focused state. In step S73, the color of the AF area icon displayed on the image display device 6 is changed to indicate that the image pickup lens 4 is in the focused state, for example. After the execution of the AF processing, the process moves to step S18 shown in FIG. 3.

As described, in the present embodiment, the user can operate the input device 7 while checking the live view of the secondary image data 50' subjected to the trapezoid correction process displayed on the image display device 6 to thereby move the position of the AF area that is an area for performing autofocus, as in the first embodiment. The position of the AF area inputted by the user is converted into the coordinates in the primary image data 50 before the trapezoid correction process is applied, and the autofocus action is executed based on the coordinates. Therefore, according to the present embodiment, the AF area at the position in the object designated by the user is not dislocated from the object as a result of the trapezoid correction process, and an image subjected to the trapezoid correction process as intended by the user can be picked up.

Third Embodiment

A third embodiment of the present invention will be described. Only differences from the first embodiment will be described below. The same constituent elements as in the first embodiment are designated with the same reference signs, and the description will be appropriately skipped.

As in the first embodiment, the image pickup apparatus 1 of the present embodiment includes the image processing unit 16 that applies the trapezoid correction process shown in FIG. 4 to the image data. As described in the first embodiment, the image processing unit 16 of the present embodiment generates the secondary image data obtained by applying the modification process of projecting the primary image data 50 onto the plane B forming the first angle αy in the pitch direction relative to the plane A parallel to the light receiving surface of the image pickup device 3 and forming the second angle αx in the yaw direction relative to the light receiving surface.

Figure 21:
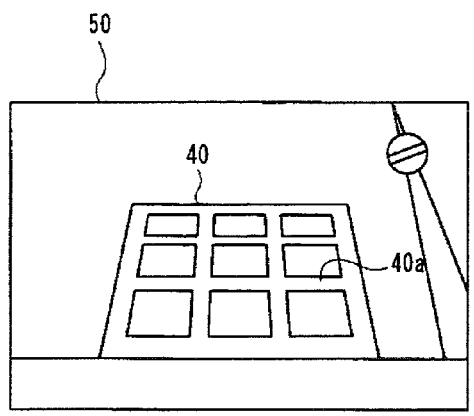
FIG. 21 is a diagram for describing a trapezoid correction process.

For example, when the image pickup apparatus 1 picks up an image so as to look up at the rectangular front surface 40*a* of the building 40 from the real viewpoint P close to the ground as shown in FIGS. 5 and 6, the front surface 40*a* is distorted into a trapezoidal shape tapered upward on the primary image data 50 as shown in FIG. 21. In this case, in the image-pickup from the real viewpoint P, the image pickup apparatus 1 is in a posture in which the optical axis of the image pickup lens 4 faces upward by the first angle αy from the horizontal line in the pitch direction. The reason that the front surface 40*a* is distorted on the primary image data 50 is that the distance from the image pickup apparatus 1 to the front surface 40*a* increases from the lower side to the upper side, and the shooting magnification changes in the up-down direction.

Figure 22:
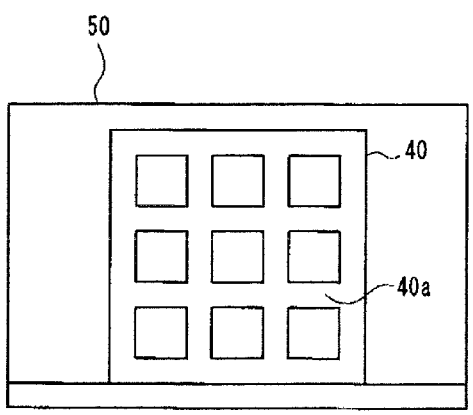
FIG. 22 is a diagram for describing the trapezoid correction process.

On the other hand, when an image is picked up by arranging the image pickup apparatus 1 at the virtual viewpoint P' facing parallel to the front surface 40*a* of the building 40, the front surface 40*a* is rectangular on the primary image data 50 as shown in FIG. 22.

Figure 23:
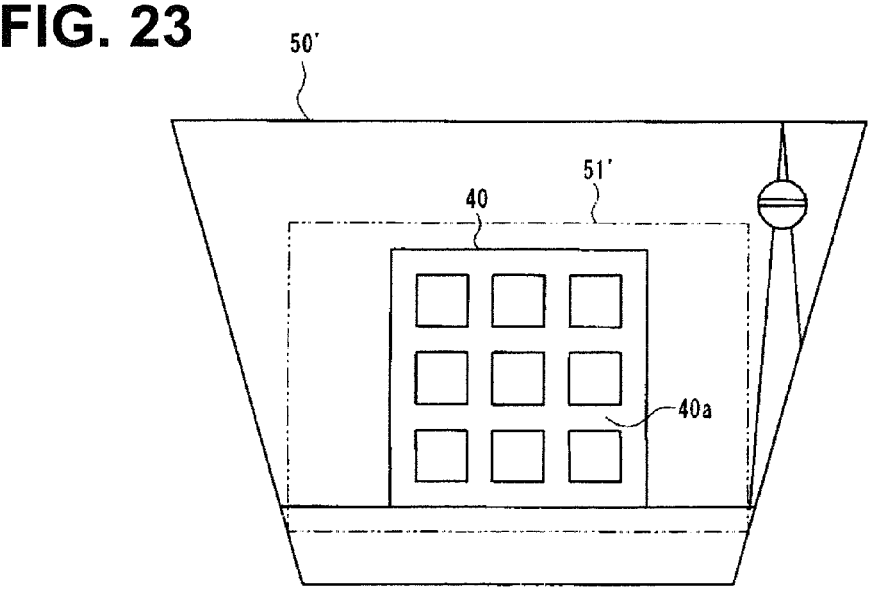
FIG. 23 is a diagram for describing the trapezoid correction process.

In the trapezoid correction process, the secondary image data 50' is obtained by modifying the primary image data 50 such that the shape of the object image in the primary image data 50 picked up from the real viewpoint P becomes similar to the shape of the object image photographed from the virtual viewpoint P' that is a virtual viewpoint as shown in FIG. 23. In other words, the primary image data 50 on the plane A parallel to the light receiving surface of the image pickup device 3 is projected onto the plane B inclined from the plane A by the first angle αy in the pitch direction, to obtain the secondary image data 50' subjected to the trapezoid correction process.

Figure 20:
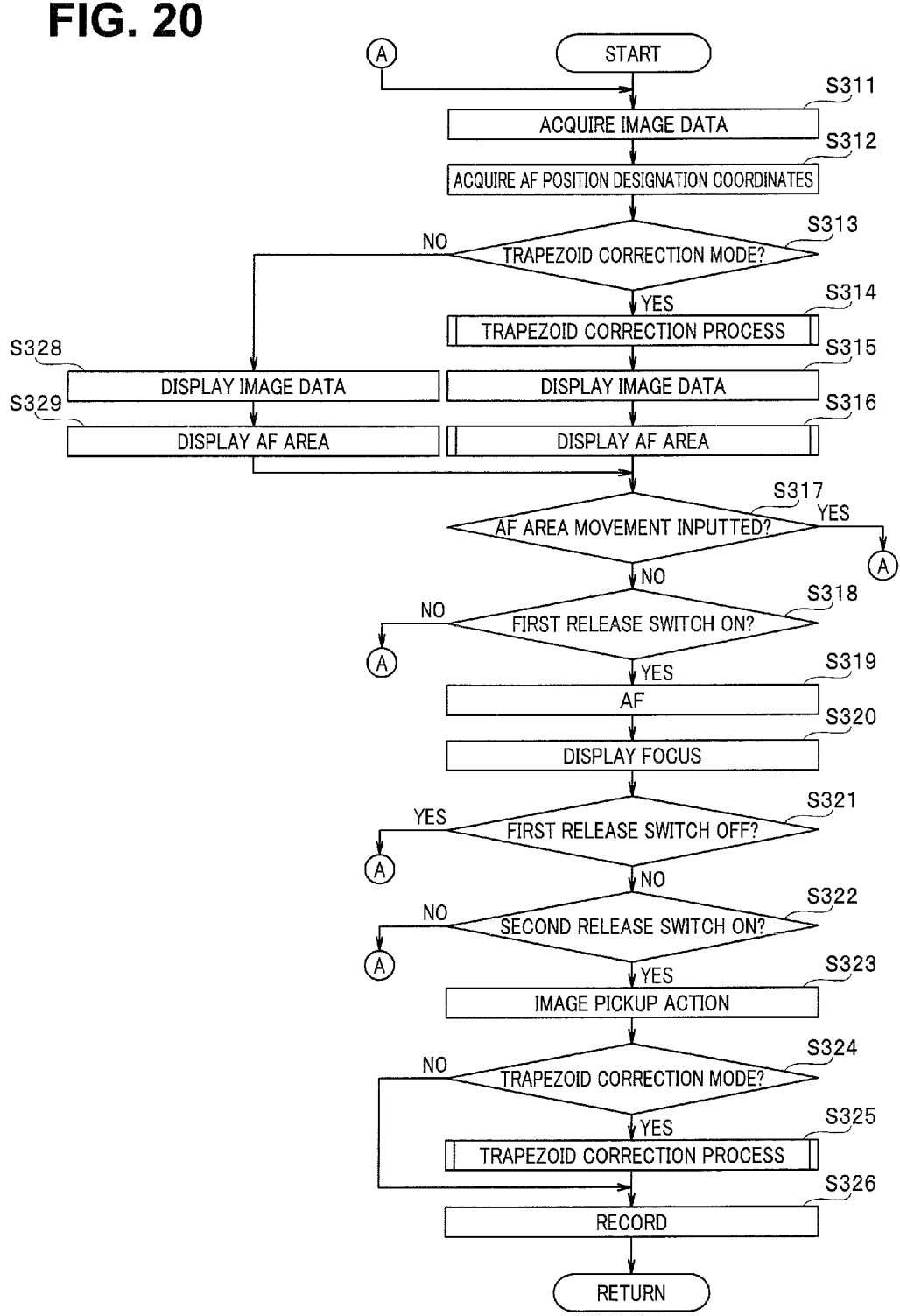
FIG. 20 is a flowchart of image pickup action of an image pickup apparatus according to a third embodiment.

Image pickup action of the image pickup apparatus 1 of the present embodiment will be described. FIG. 20 is a flowchart of the image pickup action of the image pickup apparatus 1 of the present embodiment. The flowchart shown in FIG. 20 illustrates action when the power source of the image pickup apparatus 1 is in the on-state, and the mode is the image pickup action mode. In the image pickup action mode, the live view display action is performed in the initial state, in which the primary image data is acquired from the image pickup device 3 at each predetermined frame period, and the secondary image data after the image processing by the image processing unit 16 is sequentially displayed by the image display device 6. In the image pickup action mode, the image pickup apparatus 1 executes the action of storing the object image in the storage medium 22 as electronic data according to the operation inputted to the release switch 7*b*. Note that the image pickup apparatus 1 may be able to execute the reproduction mode for reproducing and displaying the electronic data of the image stored in the storage medium 22 on the image display device 6.

The image pickup action mode ends, for example, when the user operates the power source operation switch 7*a* to put the image pickup apparatus 1 into the resting state, when operation for switching to another action mode is inputted, or when the control unit 10 judges to move to the resting state. The determination process of ending the image pickup action mode is not described in the flowchart of FIG. 20.

In the image pickup action mode, electric power is supplied to the image pickup device 3 and the image pickup device drive unit 8. To perform the live view display action, the primary image data 50 is acquired from the image pickup device 3 at each predetermined frame period. In the image pickup action mode, the primary image data 50 outputted from the image pickup device drive unit 8 is stored in the image data buffer 12*b* of the RAM 12 in step S311.

In step S312, the AF position designation coordinates that are information indicating the coordinates of the AF area in the primary image data are acquired from the log information buffer 12*c* of the RAM 12.

In step S313, whether the trapezoid correction mode is selected by the user is determined. The trapezoid correction mode is an action mode in which the image pickup apparatus 1 uses the image processing unit 16 to apply the trapezoid correction process to the primary image data 50. The user operates the four-direction switch 7*c* or the touch panel 7*e* on the GUI displayed on the image display device 6 to switch whether to select the trapezoid correction mode, for example.

If it is determined that the trapezoid correction mode is not selected by the user in step S313, the process moves to step S328, and the image based on the primary image data 50 stored in the image data buffer 12*b* of the RAM 12 is displayed on the image display device 6. That is, the image not subjected to the trapezoid correction process is displayed on the image display device 6.

The process moves to step S329, and the AF area display icon indicating the AF position designation coordinates in the primary image data 50 is superimposed and displayed on the display based on the primary image data 50 displayed on the image display device 6. After the execution of step S329, the process moves to step S317.

On the other hand, if it is determined that the trapezoid correction mode is selected by the user in step S313, the trapezoid correction process shown in FIG. 4 is executed in step S314. As a result of the execution of step S314, the secondary image data 50' obtained by applying the trapezoid correction process to the primary image data 50 is stored in the image data buffer 12*b*.

In step S315, the image based on the secondary image data 50' stored in the image data buffer 12*b* is displayed on the image display device 6. That is, the image subjected to the trapezoid correction process is displayed on the image display device 6.

The field of view of the image pickup apparatus 1 is not rectangular in the secondary image data 50' subjected to the trapezoid correction process as shown in FIG. 23. Therefore, an image of a cut-out area 51' that is part of the area of the field of view of the image pickup apparatus 1 in the secondary image data 50' is displayed on the image display device 6 in step S315. More specifically, the cut-out area 51' is an area obtained by cutting out a rectangular area in the field of view of the image pickup apparatus 1 in the secondary image data 50' at a predetermined aspect ratio as indicated by an alternate long and two short dashes line in FIG. 23. After the execution of step S315, the process moves to step S316.

Figure 24:
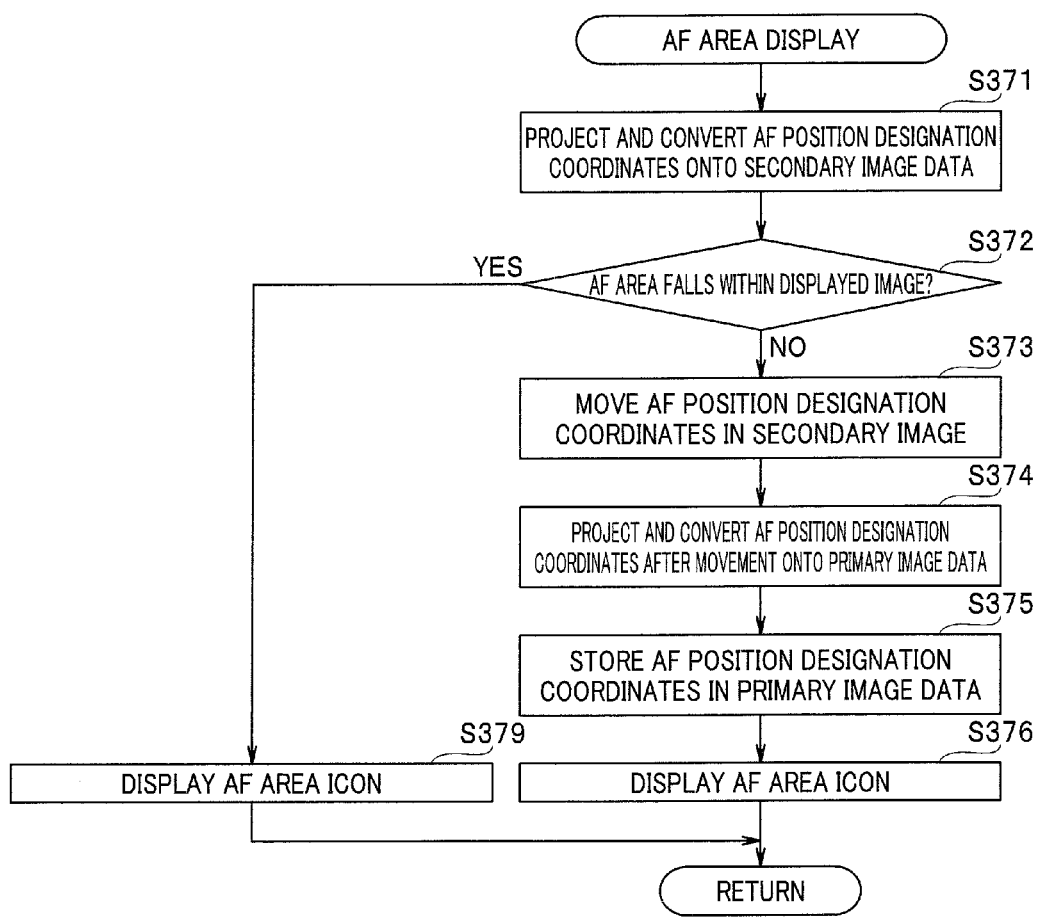
FIG. 24 is flowchart of an AF area display process according to the third embodiment.

In step S316, an AF area display process shown in a flowchart of FIG. 24 is executed. In the AF area display process, a conversion process of projecting the AF position designation coordinates 60 in the primary image data 50 onto the secondary image data 50' is executed in step S371. For the description, reference sign 60' is provided to the AF position designation coordinates projected onto the secondary image data 50' in step S371. The conversion process in step S371 is executed by using an expression obtained by modifying expression (1) of the trapezoid correction process described above.

In step S372, whether the AF position designation coordinates 60' in the secondary image data 50' calculated in step S371 fall within the cut-out area 51' is determined. As described above, the cut-out area 51' is an area in the secondary image data subjected to the trapezoid correction process displayed on the image display device 6.

Figure 25:
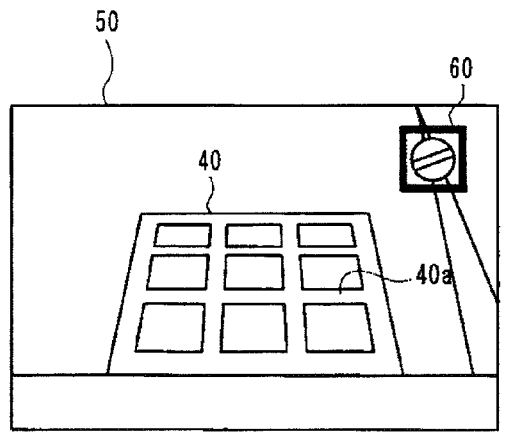
FIG. 25 is a diagram for describing the AF area display process according to the third embodiment.

For example, when the AF position designation coordinates 60 in the primary image data 50 are positioned near an outer edge portion of the primary image data 50 as shown in FIG. 25, the AF position designation coordinates 60' projected onto the secondary image data 50' may be positioned out of the area of the cut-out area 51'.

Figure 26:
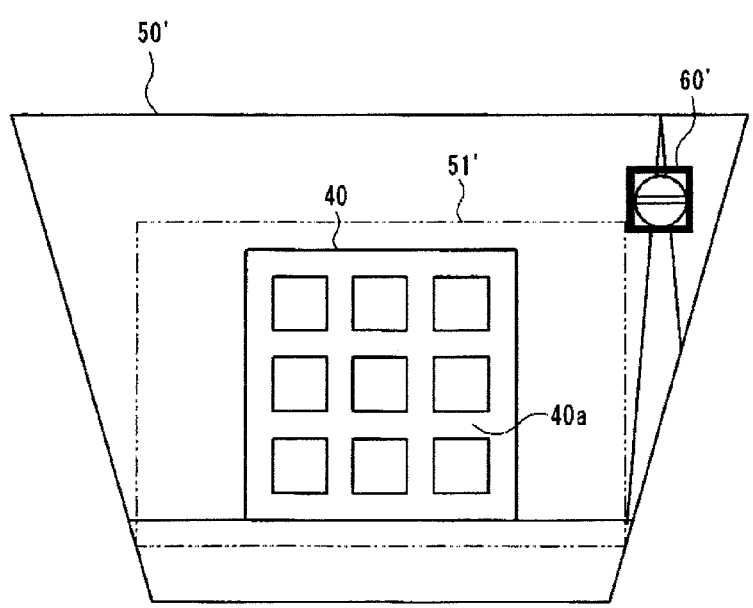
FIG. 26 is a diagram for describing the AF area display process according to the third embodiment.

As illustrated in FIG. 26, if it is determined that the AF position designation coordinates 60' in the secondary image data 50' do not fall within the cut-out area 51' in step S372, the process moves to step S373.

Figure 27:
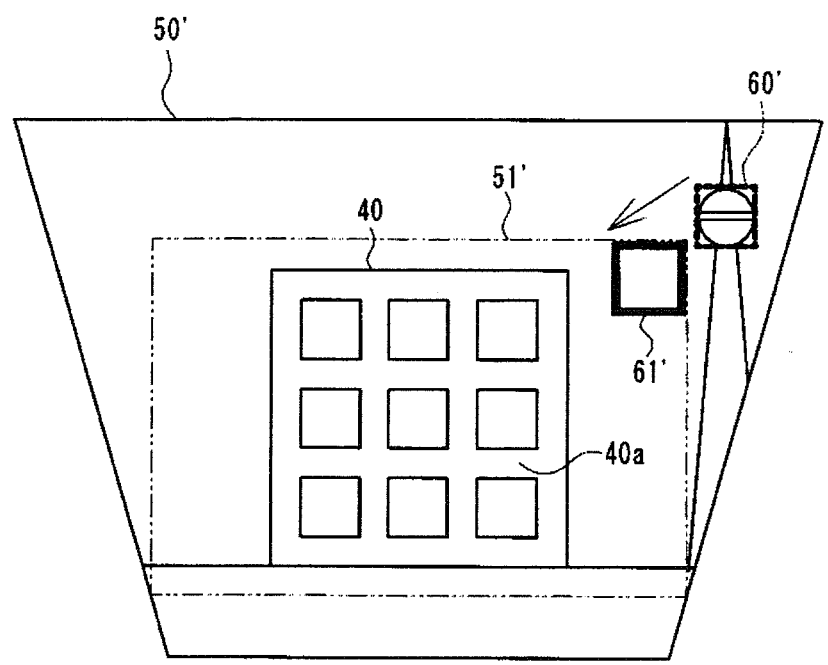
FIG. 27 is a diagram for describing the AF area display process according to the third embodiment.

In step S373, the AF position designation coordinates 60' in the secondary image data 50' are moved to secondary AF position designation coordinates 61' that are new coordinates in the cut-out area 51' as shown in FIG. 27. The movement from the AF position designation coordinates 60' to the secondary AF position designation coordinates 61' in step S373 is performed on condition that the entire AF area falls within the cut-out area 51' and that the distance between the AF position designation coordinates 60' and the secondary AF position designation coordinates 61' is shortest. The movement to the secondary AF position designation coordinates 61' is not limited to the configuration described above. For example, movement to the center in the cut-out area 51' is possible, and automatic reselection of the secondary AF position designation coordinates 61' under a predetermined condition is possible.

In step S374, a conversion process of projecting the secondary AF position designation coordinates 61' in the secondary image data calculated in step S373 onto the primary image data 50 is executed. The coordinates after the projection onto the primary image data 50 are set as primary AF position designation coordinates 61. The conversion process in step S375 is executed by using expression (1) of the trapezoid correction process described above.

In step S375, the AF position designation coordinates 60 stored in the log information buffer 12c of the RAM 12 are rewritten by the primary AF position designation coordinates 61 in the primary image data 50 calculated in step S374.

In step S376, as shown in FIG. 27, an AF area icon 62 is superimposed and displayed at the coordinates based on the secondary AF position designation coordinates 61' stored in the log information buffer 12c of the RAM 12, on the image based on the secondary image data 50' displayed on the image display device 6. After the execution of step S376, the process moves to step S317 of FIG. 20.

Note that in step S376, a warning for notifying the user of the fact that the position of the AF area icon 62 is different from the AF position designation coordinates 60 inputted by the user may be displayed on the image display device 6 along with the AF area icon 62.

In this way, the AF position designation coordinates are automatically moved into the cut-out area 51' when the AF position designation coordinates 60 in the primary image data 50 designated by the user are out of the cut-out area 51' as a result of the trapezoid correction process in the present embodiment.

On the other hand, if it is determined that the AF position designation coordinates 60' in the secondary image data 50' fall within the cut-out area 51' in step S372, the process moves to step S379. In step S379, the AF area icon 62 is superimposed and displayed at the coordinates based on the AF position designation coordinates 60' in the secondary image data 50' calculated in S71, on the image based on the secondary image data 50' displayed on the image display device 6. After the execution of step S379, the process moves to step S317 of FIG. 20.

In step S317, whether an instruction for moving the AF area is inputted through the input device 7 is determined. As described, the user operates the input device 7, such as the touch panel 7e and the four-direction switch 7c, to input the instruction for moving the AF area in the present embodiment. For example, the control unit 10 determines that the instruction for moving the AF area is inputted when the user taps inside of an area of the image data displayed on the image display device 6. The control unit 10 recognizes, as AF position designation coordinates, the coordinates in the image data corresponding to the position tapped by the user.

If it is determined that the instruction for moving the AF area is inputted in step S317, the process returns to step S311, and the action described above is repeated.

On the other hand, if it is determined that the instruction for moving the AF area is not inputted in step S317, the process moves to step S318.

In step S318, whether the first release switch of the release switch 7b is in the ON state is determined. That is, whether the release switch 7b is in the half-pressed state is determined.

If it is determined that the first release switch of the release switch 7b is in the OFF state in step S318, the process returns to step S311. That is, the action from step S311 to step S317 is repeatedly executed in synchronization with a predetermined frame period until the release switch 7b is operated. The action from step S311 to step S317 is repeated in synchronization with the predetermined frame period, and as a result, live view action is performed in which the primary image data 50 or the secondary image data 50' displayed on the image display device 6 is always updated. As a result of the repetition of the action from step S311 to step S317 in synchronization with the predetermined frame period, the AF position designation coordinates are altered according to the operation inputted to the input device 7 by the user, and the position of the AF area icon 62 in the live view display is changed according to the change in the AF position designation coordinates.

On the other hand, if it is determined that the first release switch of the release switch 7b is in the ON state in step S318, the process moves to step S319. In step S319, AF processing is executed.

In the AF processing of step S319, the AF position designation coordinates in the primary image data 50 stored in the log information buffer 12c of the RAM is read out. The focus distance is changed by controlling the AF mechanism unit 4a while detecting, for example, the contrast value or the phase difference information in the AF area around the AF position designation coordinates in the primary image data 50 to thereby put the image pickup lens 4 into the focused state.

The values of the AF position designation coordinates in the primary image data 50 may be the AF position designation coordinates 60 designated by the user or may be the primary AF position designation coordinates 61 automatically calculated in step S373 of the AF area display process described above.

When the AF processing of step S319 is finished, the color of the AF area icon 62 displayed on the image display device 6 is changed in step S320 to indicate that the image pickup lens 4 is in the focused state, for example.

In step S321, whether the first release switch of the release switch 7b is in the OFF state is determined. If it is determined that the first release switch of the release switch 7b is in the OFF state in step S321, it is determined that the user has stopped the framing operation, and the process returns to step S311 again.

On the other hand, if it is determined that the first release switch of the release switch 7b is in the ON state in step S321, the process moves to step S322. In step S322, whether the second release switch of the release switch 7b is in the ON state is determined.

If it is determined that the second release switch of the release switch 7b is in the OFF state in step S322, the process returns to step S311.

On the other hand, if it is determined that the second release switch of the release switch 7b is in the ON state in step S322, the process moves to step S323 to execute image pickup action. In the image pickup action, the image pickup device 3 is driven to pick up an image by using the exposure value calculated by the AE control unit 15, and the obtained image data is stored as image pickup image data in the image data buffer 12b.

In step S324, whether the trapezoid correction mode is selected by the user is determined. If it is determined that the trapezoid correction mode is selected by the user in step S324, the process moves to step S325, and the trapezoid correction process is applied to the image pickup image data. In step S326, the image pickup image data subjected to the trapezoid correction process is stored in the storage medium 22 as an electronic file in a predetermined format.

On the other hand, if it is determined that the trapezoid correction mode is not selected by the user in step S324, the process skips step S325 and moves to step S326, and the image pickup image data is stored in the storage medium 22 as an electronic file in a predetermined format.

As described, the image pickup apparatus 1 of the present embodiment includes: the image pickup device 3 that acquires the primary image data 50 at each predetermined frame period; the focal length detection unit 4b that acquires the focal length of the image pickup lens 4 in synchronization with the frame period; the input device 7 that inputs the correction angles including two values including the first angle αy that is an angle formed in the pitch direction relative to the light receiving surface of the image pickup device 3 and the second angle αx that is an angle formed in the yaw direction relative to the light receiving surface; the image processing unit 16 that uses the value of the focal length and the values of the correction angles in synchronization with the frame period to generate the secondary image data 50' obtained by applying the modification process of projecting the primary image data 50 onto the plane forming the first angle αy in the pitch direction relative to the light receiving surface and forming the second angle αx in the yaw direction relative to the light receiving surface; and the image display device 6 that displays the image in the rectangular cut-out area 51' in the secondary image data 50' in synchronization with the frame period.

According to the image pickup apparatus 1 of the present embodiment with the configuration, the trapezoid correction process of correcting the trapezoidal distortion of the object can be executed in two directions, the pitch direction and the yaw direction, of the image pickup apparatus 1. The user can operate the input device 7 to freely alter the degrees (correction angles) of the trapezoid correction process. In the present embodiment, the live view of the image based on the secondary image data 50' that is a result of applying the trapezoid correction process is displayed on the image display device 6, and the result of altering the correction angles is immediately reflected on the display of the live view. Therefore, the user can use the image pickup apparatus 1 of the present embodiment to apply the trapezoid correction process to the image as intended.

The image pickup apparatus 1 of the present embodiment further includes the AF control unit 14 that performs control of changing the focus distance of the image pickup lens 4. The input device 7 receives the input of the AF position designation coordinates 60 for designating the position of the AF area in the primary image data 50. The image processing unit 16 executes the conversion process of projecting the AF position designation coordinates 60 in the primary image data 50 onto the coordinates in the secondary image data 50'. The image processing unit 16 alters the AF position designation coordinates to new secondary AF position designation coordinates 61' positioned in the cut-out area 51' if the AF position designation coordinates 60' in the secondary image data 50' are positioned out of the cut-out area 51'.

According to the image pickup apparatus 1 of the present embodiment, the AF area that is an area for executing the AF action is always positioned in the image displayed on the live view in the image display device 6 even when the primary image data 50 is modified in the trapezoid correction process. This can prevent the image pickup lens 4 from focusing on an object positioned out of the image displayed on the live view in the AF action. An image subjected to the trapezoid correction process as intended by the user can be picked up.

Fourth Embodiment

A fourth embodiment of the present invention will be described. Only differences from the third embodiment will be described below. The same constituent elements as in the third embodiment are designated with the same reference signs, and the description will be appropriately skipped.

Figure 28:
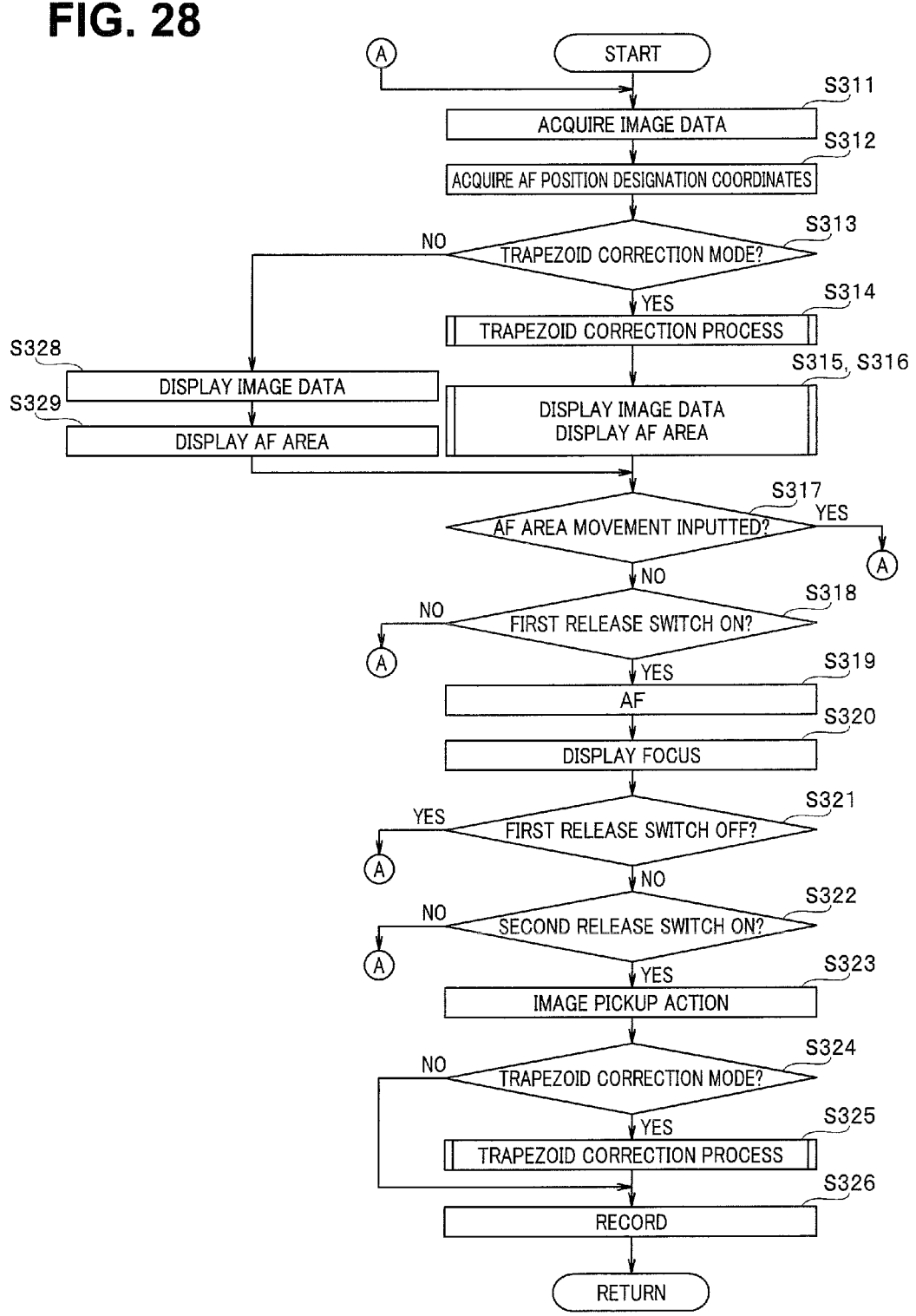
FIG. 28 is a flowchart of image pickup action of an image pickup apparatus according to a fourth embodiment.

FIG. 28 is a flowchart of the image pickup action mode of the image pickup apparatus 1 according to the present embodiment. In the present embodiment, a process of image display and AF area display for live view on the image display device 6 in the trapezoid correction mode in steps S315 and S316 is different from the first embodiment.

Figure 29:
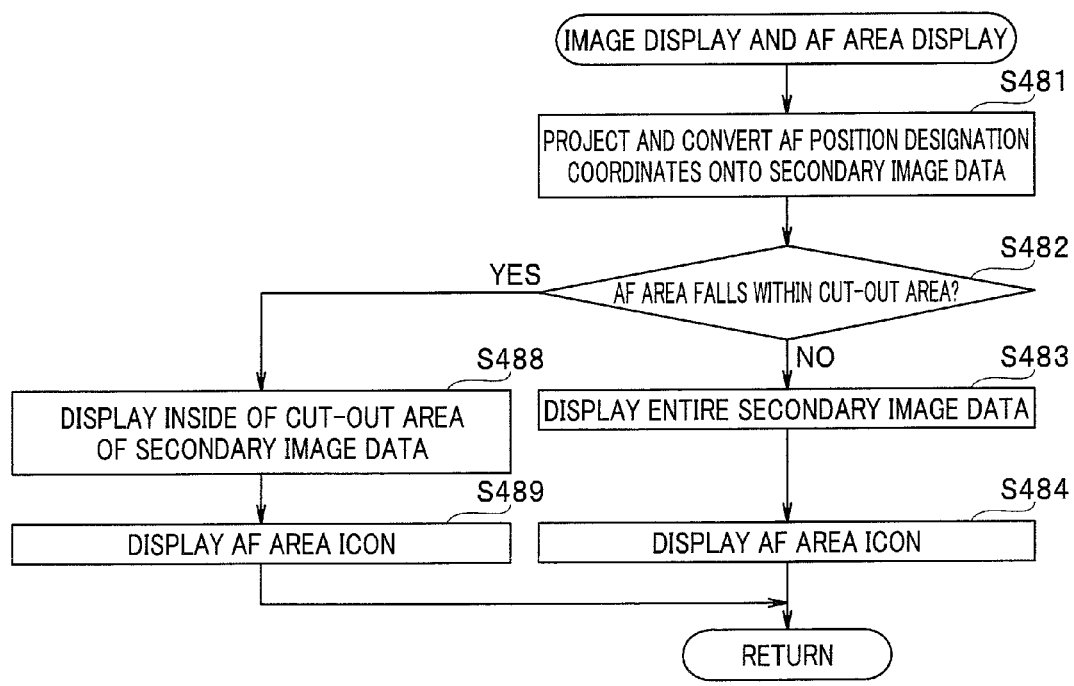
FIG. 29 is a flow chart of an image display and AF area display process of the image pickup apparatus according to the fourth embodiment.

FIG. 29 is a flowchart of the image display and AF area display process of the image pickup apparatus 1 according to the present embodiment.

In the image display and AF area display process of the present embodiment, a conversion process of projecting the AF position designation coordinates 60 in the primary image data 50 onto the secondary image data 50' is executed in step S481. As in the first embodiment, reference sign 60' is provided to the AF position designation coordinates projected onto the secondary image data 50' in step S481. The conversion process in step S481 is executed by using a conversion expression obtained by modifying expression (1) of the trapezoid correction process described above.

In step S482, whether the AF position designation coordinates 60' in the secondary image data 50' calculated in step S481 fall within the cut-out area 51' is determined. The cut-out area 51' is an area in the secondary image data subjected to the trapezoid correction process displayed on the image display device 6 as described above.

In step S482, if it is determined that the AF position designation coordinates 60' in the secondary image data 50' do not fall within the cut-out area 51' as illustrated in FIG. 26, the process moves to step S483.

In step S483, the image based on the entire secondary image data 50' stored in the image data buffer 12b of the RAM 12 is displayed on the image display device 6. In this case, the display area of the image based on the entire secondary image data 50' is wider than the display area of the image 50 based on the primary image. Therefore, the image is displayed by reducing the size of the image so that the image display device 6 can display the image. In step S484, the AF area icon 62 is superimposed and displayed at the coordinates based on the AF position designation coordinates 60' in the secondary image data 50' calculated in step S481, on the image based on the entire secondary image data 50' displayed on the image display device 6. In this case, the AF area icon 62 is reduced and displayed according to the reduction and the display of the image based on the entire secondary image data 50' in step S483.

Figure 30:
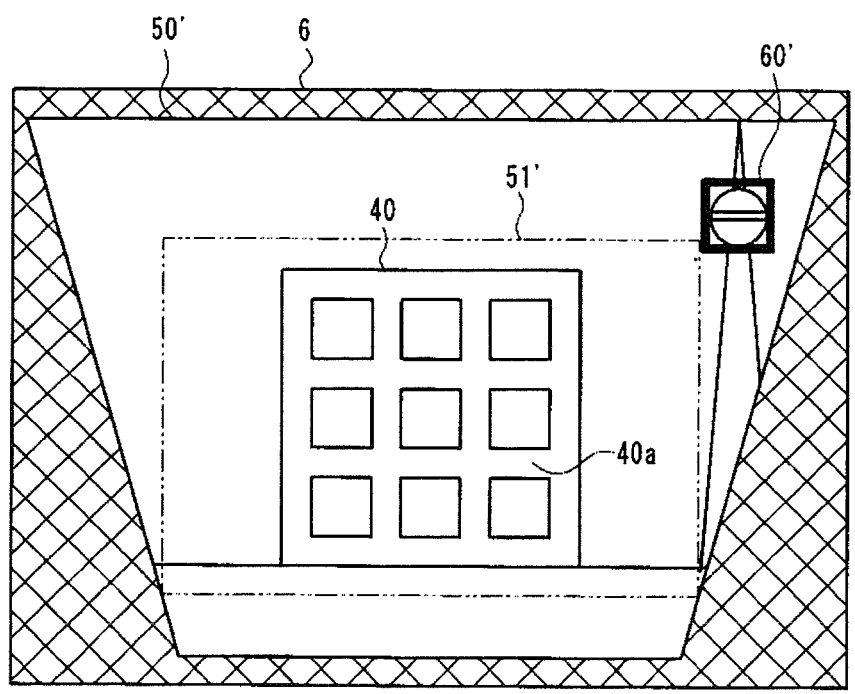
FIG. 30 is a diagram for describing the image display and AF area display process according to the fourth embodiment.

FIG. 30 shows an example of the display of the image display device 6 after the execution of step S483 and step S484. After the execution of step S484, the process moves to step S317 of FIG. 28.

On the other hand, if it is determined that the AF position designation coordinates 60' in the secondary image data 50' fall within the cut-out area 51' in step S482, the process moves to step S488.

In step S488, the image based on the image in the cut-out area 51' of the secondary image data 50' is displayed on the image display device 6. In step S489, the AF area icon 62 is superimposed and displayed at the coordinates based on the AF position designation coordinates 60' in the secondary image data 50' calculated in step S481, on the image based on the cut-out area 51' displayed on the image display device 6. After the execution of step S489, the process moves to step S317 of FIG. 28.

As described, the image of the live view display is switched to the image of the entire secondary image data 50' in the present embodiment when the AF position designation coordinates 60 in the primary image data 50 designated by the user are out of the cut-out area 51' as a result of the trapezoid correction process.

Therefore, as in the first embodiment, the AF area that is an area for executing the AF action is always positioned in the image displayed in the live view on the image display device 6 in the present embodiment even when the primary image data 50 is modified as a result of the trapezoid correction process. Thus, the focus area intended by the user is not missed from the image displayed in the live view in the AF action, and the focus area can be instructed. This allows the image pickup lens 4 to focus the object at the position intended by the user, and an image subjected to the trapezoid correction process as intended by the user can be picked up.

Fifth Embodiment

A fifth embodiment of the present invention will be described. Only differences from the fourth embodiment will be described below. The same constituent elements as in the fourth embodiment are designated with the same reference signs, and the description will be appropriately skipped.

In the fourth embodiment described above, the entire secondary image data 50' is always displayed in the live view display when the AF position designation coordinates 60 in the primary image data 50 designated by the user are out of the cut-out area 51' as a result of the trapezoid correction process. In the present embodiment, the time of displaying the entire secondary image data 50' is different.

Figure 31:
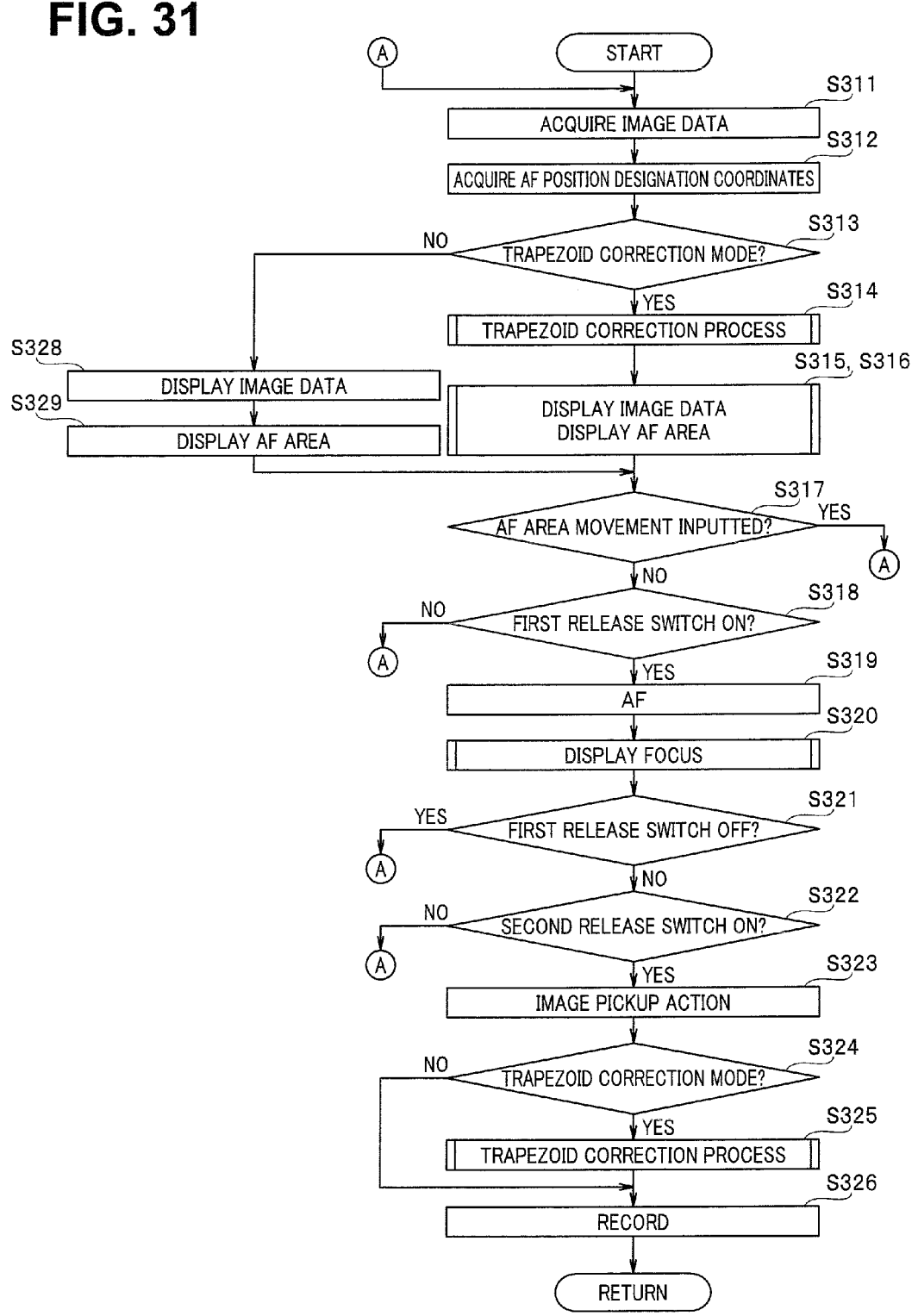
FIG. 31 is a flowchart of image pickup action of an image pickup apparatus according to a fifth embodiment.
Figure 32:
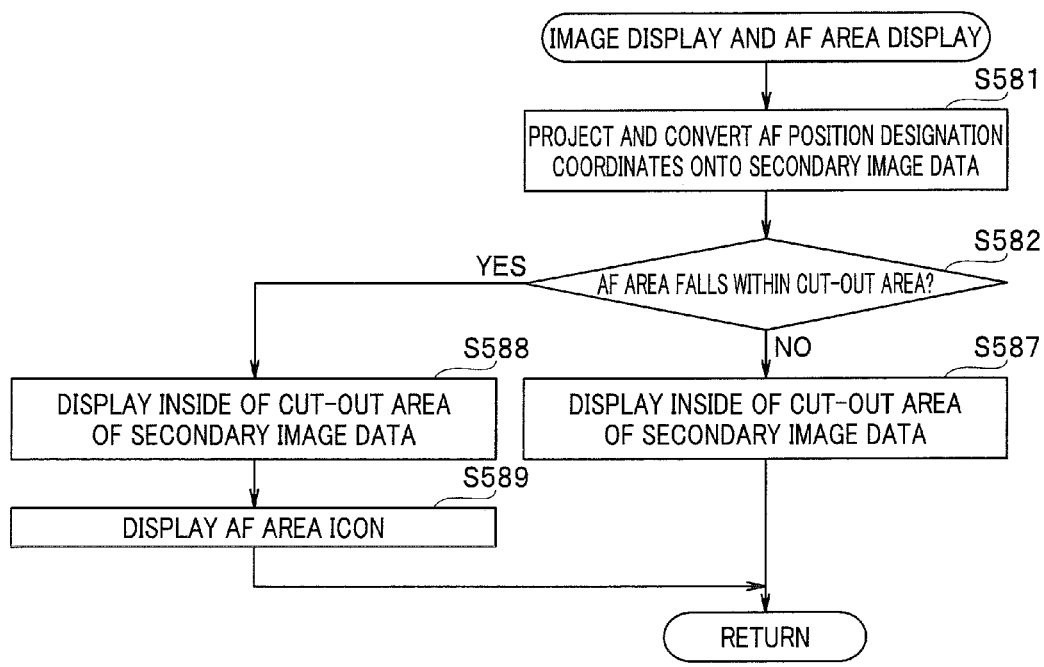
FIG. 32 is a flowchart of an image display and AF area display process of the image pickup apparatus according to the fifth embodiment.
Figure 33:
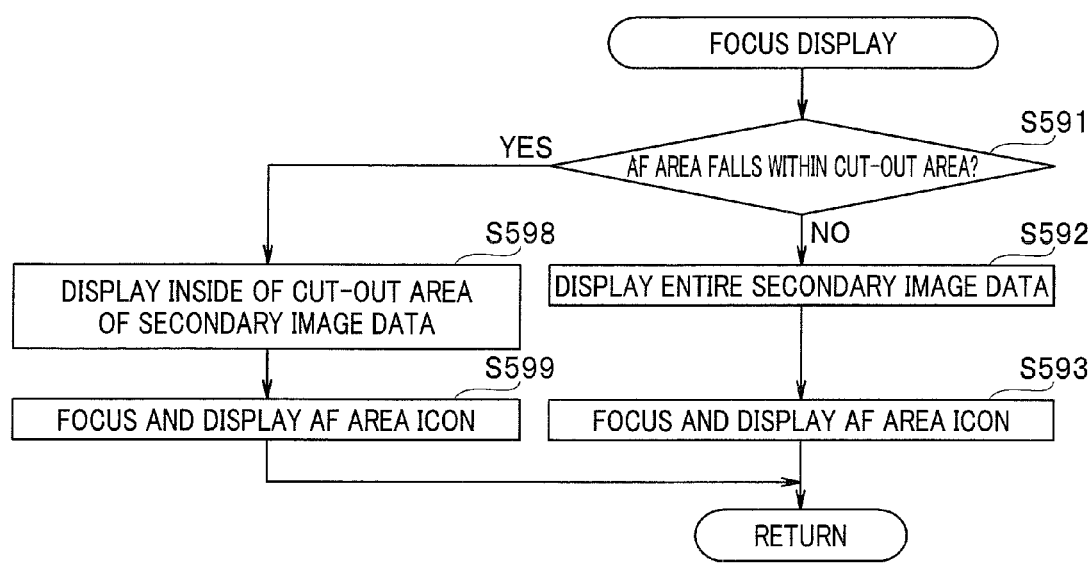
FIG. 33 is a flowchart of a focus display process of the image pickup apparatus according to the fifth embodiment.

FIG. 31 is a flowchart of the image pickup action mode of the image pickup apparatus 1 according to the present embodiment. FIG. 32 is a flowchart of the image display and AF area display process of the image pickup apparatus 1 according to the present embodiment. FIG. 33 is a flowchart of the focus display process of the image pickup apparatus 1 according to the present embodiment.

As shown in FIG. 32, in the image display and AF area display process of the image pickup apparatus 1 according to the present embodiment, a conversion process of projecting the AF position designation coordinates 60 in the primary image data 50 onto the secondary image data 50' is executed in step S581. As in the second embodiment, reference sign 60' is provided to the AF position designation coordinates projected onto the secondary image data 50' in step S581. The conversion process in step S581 is executed by using an expression obtained by modifying expression (1) of the trapezoid correction process described above.

In step S582, whether the AF position designation coordinates 60' in the secondary image data 50' calculated in step S581 fall within the cut-out area 51' is determined. The cut-out area 51' is an area in the secondary image data subjected to the trapezoid correction process displayed on the image display device 6 as described above.

In step S582, if it is determined that the AF position designation coordinates 60' in the secondary image data 50' do not fall within the cut-out area 51' as illustrated in FIG. 26, the process moves to step S587.

In step S587, the image based on the image in the cut-out area 51' of the secondary image data 50' is displayed on the image display device 6. The process of displaying the AF area icon 62 is not executed, and the process moves to step S317 of FIG. 31.

On the other hand, if it is determined that the AF position designation coordinates 60' in the secondary image data 50' fall within the cut-out area 51' in step S582, the process moves to step S588.

In step S588, the image based on the image in the cut-out area 51' of the secondary image data 50' is displayed on the image display device 6 as in the second embodiment. In step S589, the AF area icon 62 is superimposed and displayed at the coordinates based on the AF position designation coordinates 60' in the secondary image data 50' calculated in step S581, on the image based on the cut-out area 51' displayed on the image display device 6. After the execution of step S589, the process moves to step S317 of FIG. 31.

In the focus display process of step S320 executed after the completion of the autofocus action of the image pickup apparatus 1 according to the present embodiment, whether the AF position designation coordinates 60' in the secondary image data 50' calculated in step S581 fall within the cut-out area 51' is determined first as shown in step S591 of FIG. 33.

If it is determined in step S591 that the AF position designation coordinates 60' in the secondary image data 50' do not fall within the cut-out area 51' as illustrated in FIG. 26, the process moves to step S592.

In step S592, the image based on the entire secondary image data 50' stored in the image data buffer 12b of the RAM 12 is displayed on the image display device 6. In step S593, the AF area icon 62 is superimposed and displayed at the coordinates based on the AF position designation coordinates 60' in the secondary image data 50' calculated in step S581, on the image based on the entire secondary image data 50' displayed on the image display device 6 as shown for example in FIG. 26. The color of the AF area icon 62 is changed to a predetermined color to indicate that the image pickup lens 4 is in the focused state, for example. After the execution of step S593, the process moves to step S321 of FIG. 31.

On the other hand, if it is determined that the AF position designation coordinates 60' in the secondary image data 50' fall within the cut-out area 51' in step S591, the process moves to step S598.

In step S598, the image based on the image in the cut-out area 51' of the secondary image data 50' is displayed on the image display device 6. In step S599, the AF area icon 62 is superimposed and displayed at the coordinates based on the AF position designation coordinates 60' in the secondary image data 50' calculated in step S581, on the image based on the cut-out area 51' displayed on the image display device 6. After the execution of step S599, the process moves to step S321 of FIG. 31.

As described, when the AF position designation coordinates 60 in the primary image data 50 designated by the user are out of the cut-out area 51' as a result of the trapezoid correction process, the entire secondary image data 50' and the AF area icon 62 are displayed on the image display device 6 only in the focus display after the completion of the autofocus action in the present embodiment.

According to the present embodiment, the user can check the position of the AF area even when the primary image data 50 is modified in the trapezoid correction process. Therefore, the focus area intended and instructed by the user is not missed from the image displayed in the live view in the AF action, and the user can recognize the instructed focus area. This allows the image pickup lens 4 to focus the object at the position intended by the user, and an image subjected to the trapezoid correction process as intended by the user can be picked up.

Note that the present invention is not limited to the embodiments described above, and alterations can be appropriately made without departing from the scope or the concept of the invention understood from the claims and the entire description. Image pickup apparatuses and image pickup methods with the alterations are also included in the technical scope of the present invention.

The image pickup apparatus according to the present invention is not limited to the form of the digital camera as described in the embodiments, and for example, the image pickup apparatus may be in a form of an electronic device with an image pickup function. Examples of the electronic device with the image pickup function include a portable communication terminal, a gaming machine, a digital media player, a wristwatch, a voice recorder, and binoculars.

What is claimed is:

1. An image pickup apparatus comprising:
   an image pickup device arranged such that a light receiving surface is orthogonal to an optical axis of an image pickup lens, the image pickup device acquiring primary image data at each predetermined frame period;
   a focal length detection unit that acquires a focal length of the image pickup lens in synchronization with the frame period;
   an input device that receives input of correction angles including two values including a first angle that is an angle formed in a pitch direction relative to the light receiving surface and a second angle that is an angle formed in a yaw direction relative to the light receiving surface;
   an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface;
   an image display device that displays an image based on the secondary image data in synchronization with the frame period; and
   an AF control unit that performs control of changing a focus distance of the image pickup lens, wherein
   the input device receives input of designating a position of an AF area in the secondary image data displayed on the image display device,
   the image processing unit executes a conversion process of projecting the position of the AF area in the secondary image data onto a plane including the primary image data, and
   the AF control unit changes the focus distance of the image pickup lens to put the image pickup lens into a focused state at a position on the light receiving surface corresponding to the AF area projected onto the plane including the primary image data.

2. The image pickup apparatus according to claim 1, wherein
   an outer shape of the AF area in the secondary image data is rectangular,
   the image processing unit executes a conversion process of projecting the position and the shape of the AF area in the secondary image data onto the plane including the primary image data, and
   the AF control unit changes the focus distance of the image pickup lens to put the image pickup lens into the focused state based on a contrast value or phase difference information of an image on the light receiving surface corresponding to inside of the AF area projected onto the plane including the primary image data.

3. The image pickup apparatus according to claim 1, wherein
   an outer shape of the AF area on the light receiving surface is rectangular,
   the image processing unit applies a modification process of projecting the outer shape of the AF area on the light receiving surface onto a plane including the secondary image data, and the image display device displays the shape of the AF area projected onto the plane including the secondary image data, superimposed on an image based on the secondary image data.

4. An image pickup method of an image pickup apparatus, the image pickup apparatus comprising:
   an image pickup device arranged such that a light receiving surface is orthogonal to an optical axis of an image pickup lens, the image pickup device acquiring primary image data at each predetermined frame period;
   a focal length detection unit that acquires a focal length of the image pickup lens in synchronization with the frame period;
   an input device that receives input of correction angles including two values including a first angle that is an angle formed in a pitch direction relative to the light receiving surface and a second angle that is an angle formed in a yaw direction relative to the light receiving surface;
   an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface;

an image display device that displays an image based on the secondary image data in synchronization with the frame period; and an AF control unit that performs control of changing a focus distance of the image pickup lens, the image pickup method comprising:

a step of receiving, by the input device, input of designating a position of an AF area in the secondary image data displayed on the image display device;

a step of executing, by the image processing unit, a conversion process of projecting the position of the AF area in the secondary image data onto the plane including the primary image data; and a step of changing, by the AF control unit, the focus distance of the image pickup lens to put the image pickup lens into a focused state at a position on the light receiving surface corresponding to the AF area projected onto the plane including the primary image data.

5. An image pickup apparatus comprising:

an image pickup device arranged such that a light receiving surface is orthogonal to an optical axis of an image pickup lens, the image pickup device acquiring primary image data at each predetermined frame period;

a focal length detection unit that acquires a focal length of the image pickup lens in synchronization with the frame period;

an input device that receives input of correction angles including two values including a first angle that is an angle formed in a pitch direction relative to the light receiving surface and a second angle that is an angle formed in a yaw direction relative to the light receiving surface;

an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface;

an image display device that displays an image in a rectangular cut-out area in the secondary image data in synchronization with the frame period; and an AF control unit that performs control of changing a focus distance of the image pickup lens, wherein the input device receives input of designating a position of an AF area in the primary image data displayed on the image display device, and the image processing unit executes a conversion process of projecting the coordinates of the AF area in the primary image data onto the coordinates in the secondary image data, and as a result of the conversion process, if the coordinates of the AF area in the secondary image data are out of the cut-out area, the image processing unit alters the coordinates of the AF area to the coordinates in the cut-out area.

6. The image pickup apparatus according to claim 5, wherein the image processing unit executes the conversion process of projecting the coordinates of the AF area in the primary image data onto the coordinates in the secondary image data, and as a result of the conversion process, if the coordinates of the AF area in the secondary image data are out of the cut-out area, the image processing unit alters the coordinates of the AF area to the coordinates in the cut-out area, to minimize a distance of the altered coordinates of the AF area to the coordinates of the AF area in the secondary image data before the alteration.

7. The image pickup apparatus according to claim 5, wherein the image processing unit executes the conversion process of projecting the coordinates of the AF area in the primary image data onto the coordinates in the secondary image data, and as a result of the conversion process, if the coordinates of the AF area in the secondary image data are out of the cut-out area, the image processing unit alters the coordinates of the AF area to the coordinates area at a center position in the cut-out area.

8. An image pickup apparatus comprising:

an image pickup device arranged such that a light receiving surface is orthogonal to an optical axis of an image pickup lens, the image pickup device acquiring primary image data at each predetermined frame period;

a focal length detection unit that acquires a focal length of the image pickup lens in synchronization with the frame period;

an input device that receives input of correction angles including two values including a first angle that is an angle formed in a pitch direction relative to the light receiving surface and a second angle that is an angle formed in a yaw direction relative to the light receiving surface;

an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface;

an image display device that displays an image in a rectangular cut-out area in the secondary image data in synchronization with the frame period; and an AF control unit that performs control of changing a focus distance of the image pickup lens, wherein the input device receives input of designating a position of an AF area in the primary image data displayed on the image display device, and the image processing unit executes a conversion process of projecting the coordinates of the AF area in the primary image data onto the coordinates in the secondary image data, and as a result of the conversion process, if the coordinates of the AF area in the secondary image data are out of the cut-out area, the image processing unit displays, on the image display device, the entire secondary image data and an AF area icon indicating the position of the AF area in the secondary image data.

9. An image pickup method of an image pickup apparatus, the image pickup apparatus comprising:

an image pickup device arranged such that a light receiving surface is orthogonal to an optical axis of an image pickup lens, the image pickup device acquiring primary image data at each predetermined frame period;

a focal length detection unit that acquires a focal length of the image pickup lens in synchronization with the frame period;

an input device that receives input of correction angles including two values including a first angle that is an angle formed in a pitch direction relative to the light receiving surface and a second angle that is an angle formed in a yaw direction relative to the light receiving surface;

an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface;

an image display device that displays an image in a rectangular cut-out area in the secondary image data in synchronization with the frame period; and an AF control unit that performs control of changing a focus distance of the image pickup lens, the image pickup method comprising:

a step of receiving, by the input device, input of designating a position of an AF area in the primary image data displayed on the image display device; and a step of executing, by the image processing unit, a conversion process of projecting coordinates of the AF area in the primary image data onto coordinates in the secondary image data and as a result of the conversion processing, if the coordinates of the AF area in the secondary image data are out of the cut-out area, altering the coordinates of the AF area to coordinates in the cut-out area.

10. An image pickup method of an image pickup apparatus, the image pickup apparatus comprising:

an image pickup device arranged such that a light receiving surface is orthogonal to an optical axis of an image pickup lens, the image pickup device acquiring primary image data at each predetermined frame period;

a focal length detection unit that acquires a focal length of the image pickup lens in synchronization with the frame period;

an input device that receives input of correction angles including two values including a first angle that is an angle formed in a pitch direction relative to the light receiving surface and a second angle that is an angle formed in a yaw direction relative to the light receiving surface;

an image processing unit that uses a value of the focal length and the values of the correction angles in synchronization with the frame period to generate secondary image data obtained by applying a modification process of projecting the primary image data onto a plane forming the first angle in the pitch direction relative to the light receiving surface and forming the second angle in the yaw direction relative to the light receiving surface;

an image display device that displays an image in a rectangular cut-out area in the secondary image data in synchronization with the frame period; and an AF control unit that performs control of changing a focus distance of the image pickup lens, the image pickup method comprising:

a step of receiving, by the input device, input of designating a position of an AF area in the primary image data displayed on the image display device; and a step of executing, by the image processing unit, a conversion process of projecting coordinates of the AF area in the primary image data onto coordinates in the secondary image data and as a result of the conversion processing, if the coordinates of the AF area in the secondary image data are out of the cut-out area, displaying, on the image display device, the entire secondary image data and an AF area icon indicating the position of the AF area in the secondary image data.

* * * * *